United States Patent [19]
Higuchi et al.

[11] Patent Number: 5,378,954
[45] Date of Patent: Jan. 3, 1995

[54] ELECTROSTATIC ACTUATOR

[75] Inventors: Toshiro Higuchi, Yokohama; Saku Egawa, Tokyo; Masao Hiyane; Katsuhide Natori, both of Yokohama, all of Japan

[73] Assignee: Fujitsu Limited, Kawasaki, Japan

[21] Appl. No.: 778,216

[22] PCT Filed: Apr. 16, 1991

[86] PCT No.: PCT/JP91/00497

§ 371 Date: Feb. 6, 1992

§ 102(e) Date: Feb. 6, 1992

[87] PCT Pub. No.: WO91/16757

PCT Pub. Date: Oct. 31, 1991

[30] Foreign Application Priority Data

Apr. 16, 1990 [JP] Japan .................. 2-099694

[51] Int. Cl.$^6$ .............................................. H02N 1/00
[52] U.S. Cl. .................................. 310/309; 310/12; 318/116
[58] Field of Search ............... 310/309, 12, 308, 310, 310/40 MM; 318/116, 135

[56] References Cited

U.S. PATENT DOCUMENTS

| 3,729,925 | 5/1973 | Emerson | 310/308 M X |
|---|---|---|---|
| 4,095,155 | 6/1978 | Brooks | 310/308 M X |
| 5,180,940 | 1/1993 | Paratte | 310/309 |
| 5,187,399 | 2/1993 | Carr | 310/309 |
| 5,191,251 | 3/1993 | Paratte | 310/309 |
| 5,239,222 | 8/1993 | Higuchi et al. | 310/309 |

FOREIGN PATENT DOCUMENTS

| 2256 | 4/1957 | Japan . | |
|---|---|---|---|
| 5662077 | 10/1979 | Japan . | |
| 63-136979 | 6/1988 | Japan . | |
| 63-136980 | 6/1988 | Japan . | |
| 136982 | 6/1988 | Japan . | |
| 0694962 | 10/1979 | U.S.S.R. | 310/309 |

OTHER PUBLICATIONS

Report No. 737 of the 89$^{th}$ National Meeting of the Society of Electrical Engineering, "Electrostatic Actuator Using Resistance Body for Moving Element", authored by Toshiro Higuchi and Saku Egawa, published Mar. 10, 1989 at Ehime University in Matsuyama City, Kagawa-ken, Japan.

S. Egawa et al.: "Multi-Layered Electrostatic Film Actuator," IEEE Proceedings: Micro Electro Mechanical Systems, 11 Feb. 1990, Napa Valley, Calif., pp. 166-171.

Electrostatic Handbook, edited by the Society of Electrostatic Engineering, published by Ohm-sha, pp. 664-675. 28/Aug./1956.

(List continued on next page.)

*Primary Examiner*—R. Skudy
*Attorney, Agent, or Firm*—Staas & Halsey

[57] ABSTRACT

An electrostatic actuator comprising:

a first member (1) having a plurality of belt-like electrodes (4) insulated from one another and disposed in a predetermined direction with predetermined gaps between them;

a second member (10) constituted by a resistance body on the opposed surface thereof coming into contact with the surface of the first member (1); and control means (11) capable of changing an impressed voltage to be applied to each of a plurality of belt-like electrodes disposed on the first member;

the control means (11) being constituted so as to move the first and second members relative to each other by applying a predetermined voltage pattern consisting of a pulse voltage to the belt-like electrodes. The resistance body of the second member is selected so that the value of the time constant, which is primarily determined by a volume resistivity and dielectric constant of the material constituting the resistance body, becomes twice the time necessary four at least one of the first and second members to move relative to the other by a distance corresponding to the length between the electrodes.

12 Claims, 48 Drawing Sheets

OTHER PUBLICATIONS

*World Patents Index Latest*, Week 8417, Derwent Publications Ltd., London, GB; AN 84105850 & SU-A-1 029 361 (Bushuev) 15 Jul. 1983.
*Patent Abstracts of Japan*, vol. 12, No. 395 (E-671)[3242] 20 Oct. 1988 & JP-A-63 136979 (Canon) 9 Jun. 1988.
*Patent Abstracts of Japan*, vol. 12, No. 395 (E-671)[3242] 20 Oct. 1988 & JP-A-63 136980 (Canon) 9 Jun. 1988.
S. F. Bart et al.: "An Analysis of Electroquasistatic Induction Micromotors," *Sensors And Actuators*, vol. 20, No. ½, 15 Nov. 1989, Lausanne, CH, pp. 97–106.
S. Egawa et al.: "Multi-Layered Electrostatic Film Actuator," *IEEE Proceedings: Micro Electro Mechanical Systems*, 11 Feb. 1990, Napa Valley, Calif., pp. 166–171.
*Patent Abstracts of Japan*, vol. 15, No. 62 (E-1033) 14 Feb. 1991 & JP-A-2 285978 (Res Dev Corp of Japan) 26 Nov. 1990.

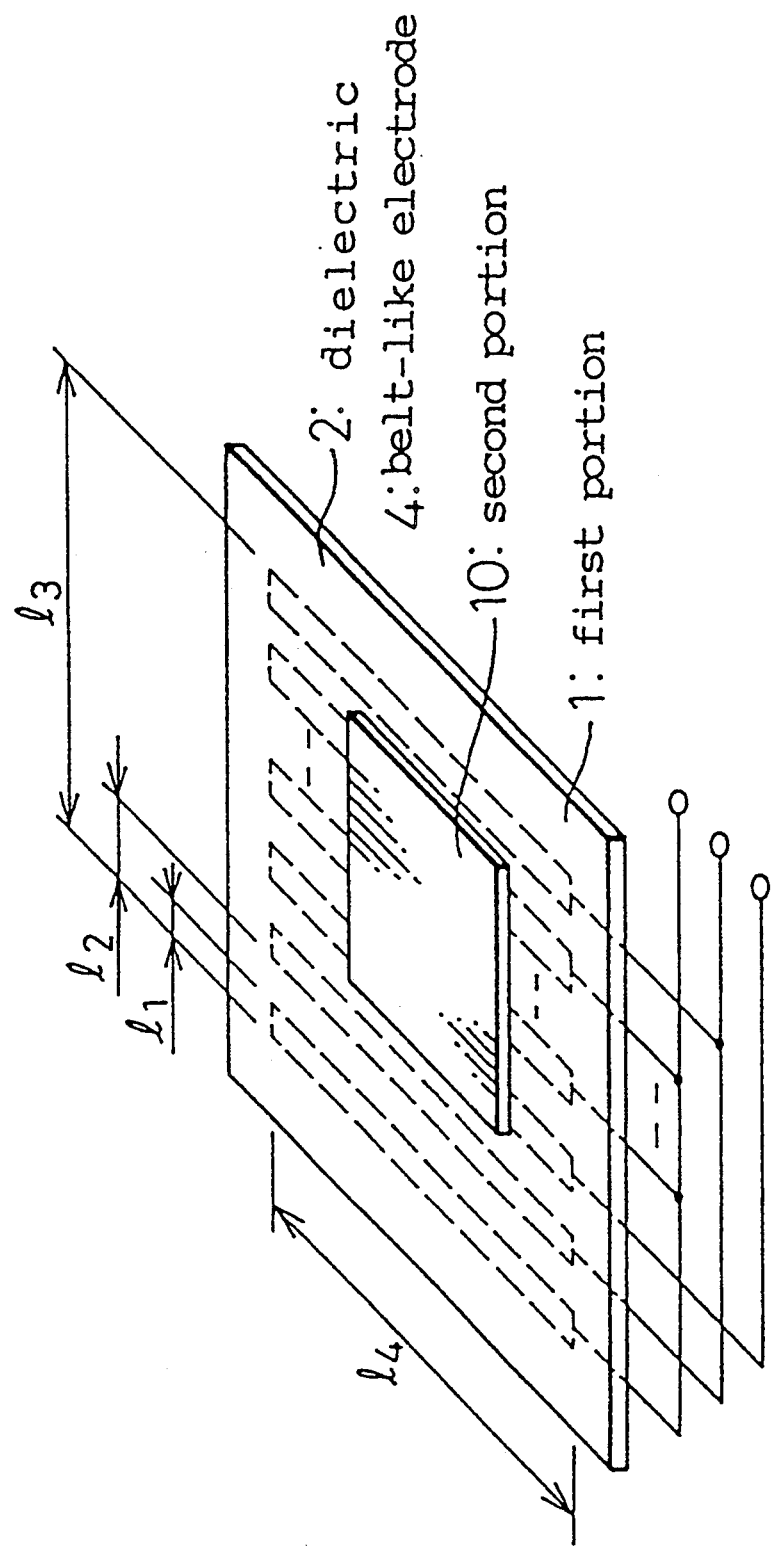

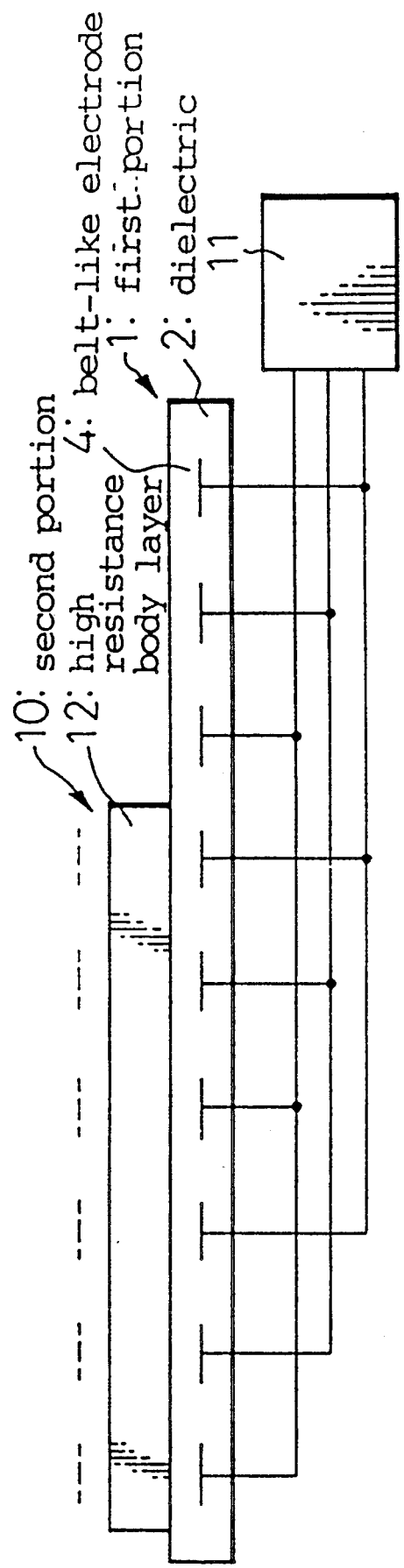

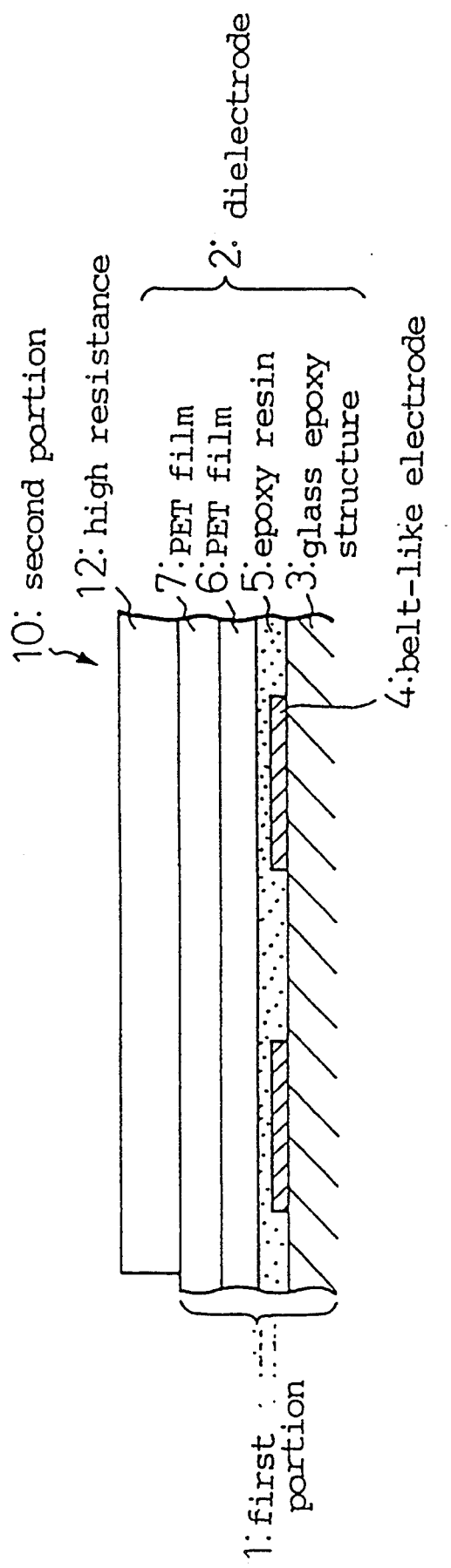

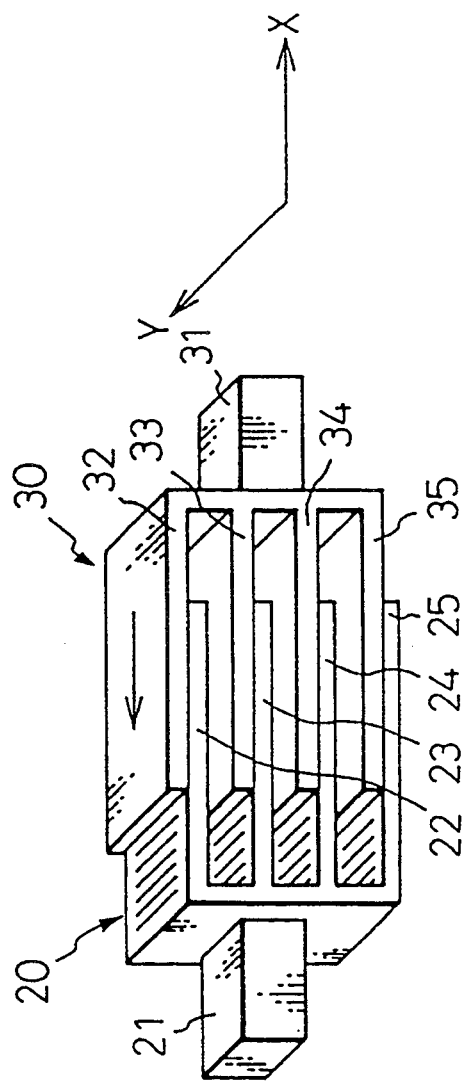

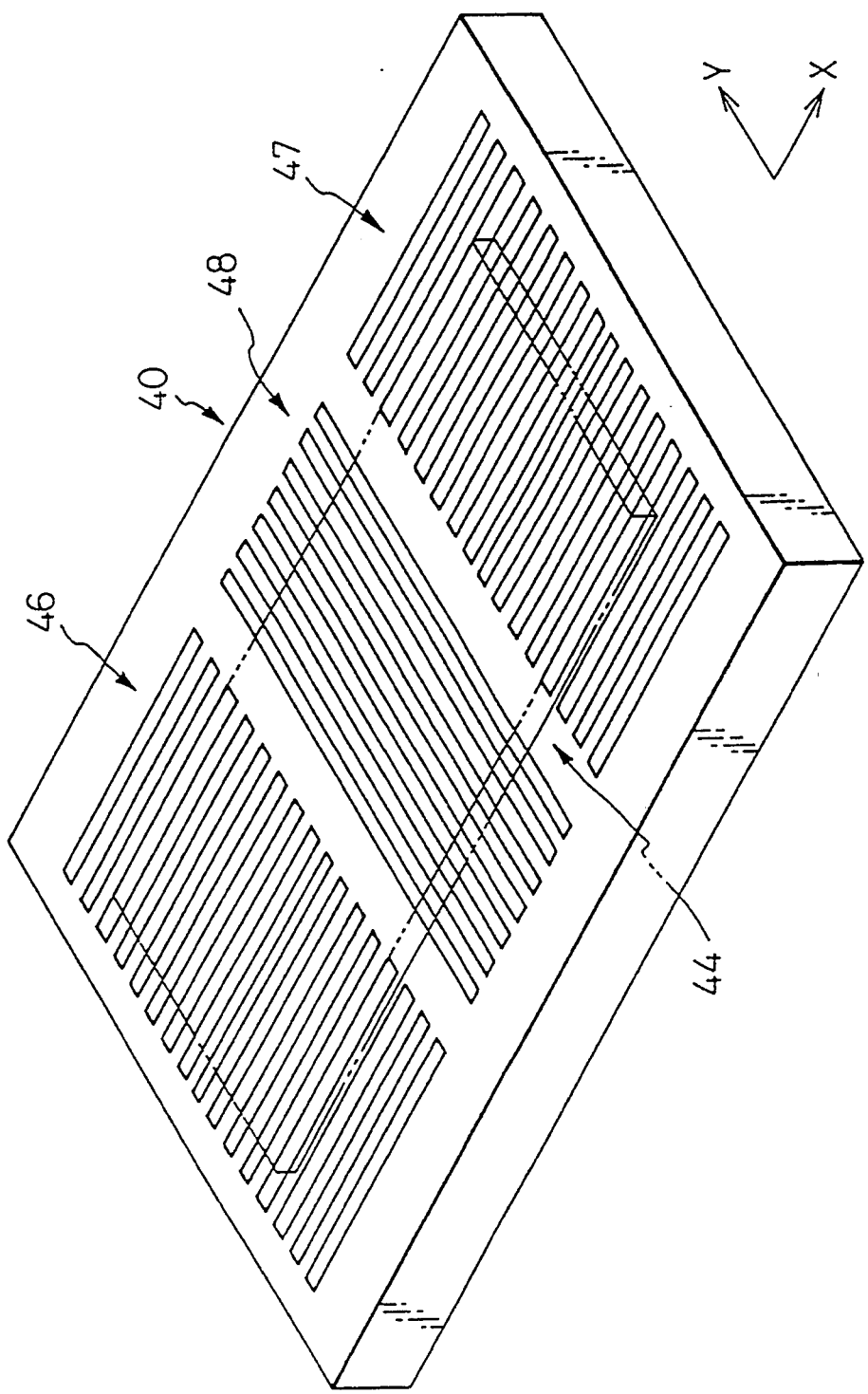

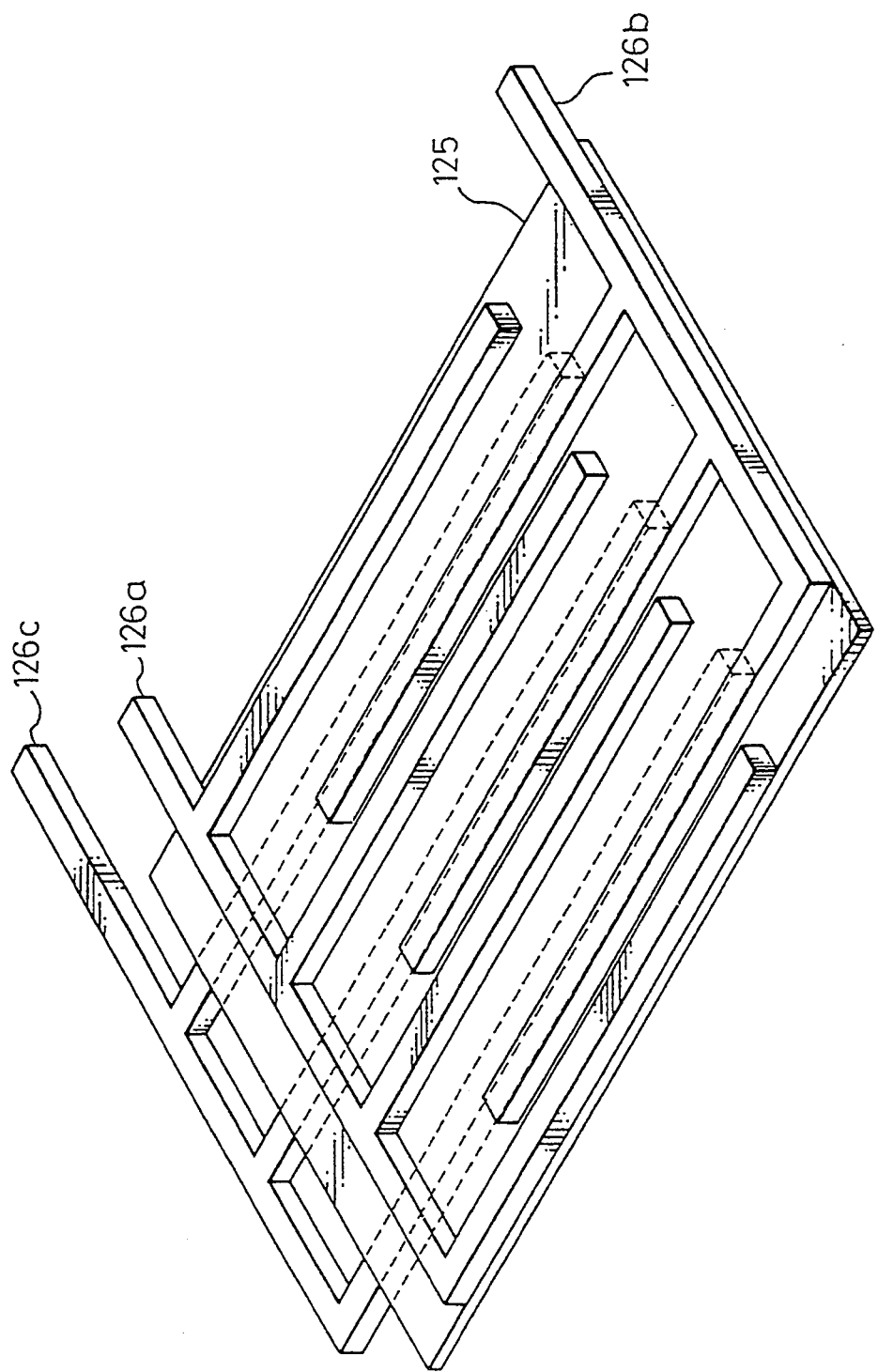

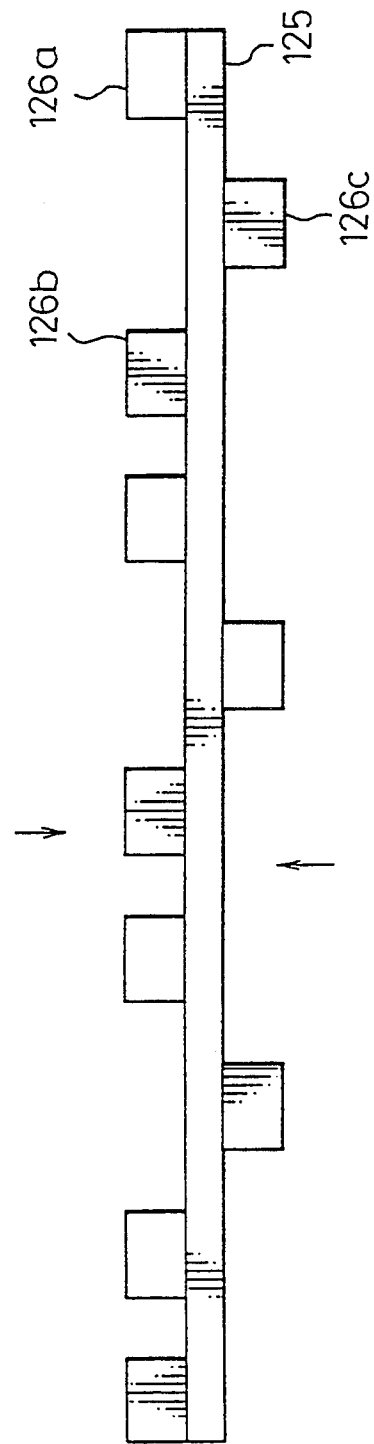
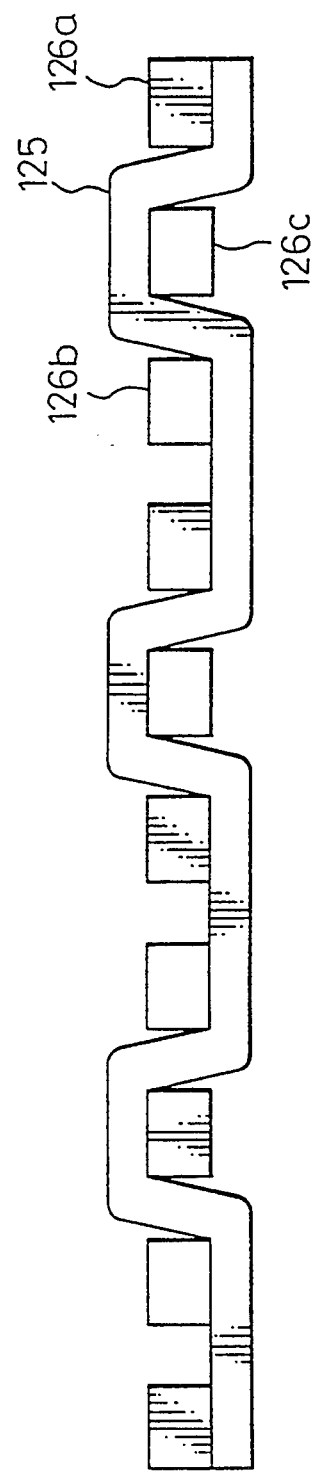

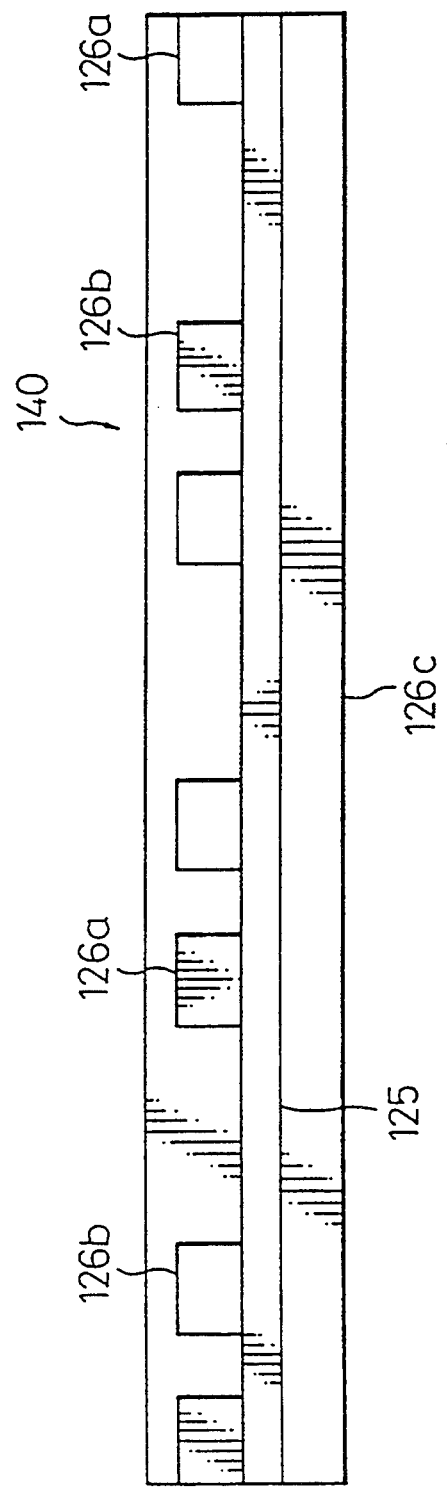

ELECTROSTATIC ACTUATOR

BACKGROUND OF THE INVENTION

1. Field of the Invention

This invention relates to an electrostatic actuator.

2. Description of the Related Art

An electrostatic generator has been well known in the past as an apparatus for converting mechanical energy to electric field energy, and an electrostatic motor is an apparatus for effecting the reverse operation to the above, that is, for converting electric field energy to mechanical energy.

The history of such an electrostatic motor is long, and this motor was already examined from the 18th century. The history of this motor is described in detail in, for example, "Electrostatic Handbook", edited by the Society of Electrostatic Engineering, published by Ohmsha, pp. 664-675.

The reference described above illustrates an induction motor which utilizes the delay of polarization of dielectrics.

The principle of this induction motor utilizes the time delay of polarization of a dielectric member on the basis of the concept that when the dielectric member is placed inside an electric field, it causes polarization.

In other words, when the dielectric member as a rotor is placed inside a rotating electric field inside a stator, an induction load of the dielectric member has a deviated angle from the rotating electric field due to the time delay.

The interaction between the charge and the rotating electric field results in the turning force.

Motors that use a resistance body in place of the dielectric member are also known. The motors of this kind utilize the phenomenon that the charge induced into the resistance body inside the rotating electric field gets delayed in the direction of the electric field. However, the conventional electrostatic motors involve the following drawbacks.

(1) A force whose direction crosses orthogonally a desired force of operation, that is, the attraction, acts between the resistance body and an electrode. Therefore, a film structure of the motor is difficult to attain.

(2) The motor comprises a rotary mechanism including a stator and a rotor and having a certain gap. A mechanism such as a bearing is used to retain this gap. It is therefore difficult to reduce the gap over a wide area. To accomplish this object, the stator and the rotor must be sufficiently thick so as to improve rigidity. Therefore, the mass of the members for keeping this rigidity becomes great and a density of force (the force that can be generated per unit area) deteriorates.

Accordingly, the motor cannot be made compact in size and its density of force is low, too.

Report No. 737 of the 89th National Meeting of the Society of Electric Engineering, entitled "Electrostatic Actuator Using Resistance Body for Moving Element", proposes an electrostatic actuator capable of solving the problems described above.

This electrostatic actuator comprises a stator having a plurality of belt-like electrodes which are insulated from one another, a moving member which includes an insulator layer and a high resistance body layer and on the surface of which a charge pattern is induced in accordance with a voltage pattern applied to the belt-like electrodes, and control means for driving the moving member by switching the voltage to the belt-like electrodes.

This electrostatic actuator can generate an electrostatic force between solid surfaces and can obtain a greater density of force by reducing the gap between the solid surfaces and increasing its surface area.

Since repulsion is once allowed to act in a direction in which the moving member floats up from the stator, the resultant force can be effectively converted to a driving force.

However, the conventional electrostatic actuator is not free from the problem that the structure is complicated, because the moving member has a two-layered structure of the insulator layer and the high resistance body layer.

Since the resistance body is utilized, the time constant for charging the moving member must be set to a sufficiently long time in comparison with the time necessary for the moving member to move the distance required for moving in each cycle at the time of driving the belt-like electrodes. In other words, there is the problem that an initial charging time is long at the start of operation.

It is an object of the present invention to provide an electrostatic actuator whose structure can be simplified and can reduce the charging time in view of the conventional problems described above.

SUMMARY OF THE INVENTION

The objects described above can be accomplished by employing the following technical structure.

In other words, the objects described above can be accomplished by an electrostatic actuator which comprises:

- a first member having a plurality of belt-like electrodes insulated from one another and disposed in a predetermined direction with predetermined gaps between them;
- a second member constituted by a resistance body on its opposed surface which comes into contact with the surface of the first member; and
- control means for changing an impressed voltage to each of the belt-like electrodes disposed on the first member;
- the control means being so constituted as to move the first and second member relative to each other in a direction crossing orthogonally the direction of disposition of the belt-like electrodes, when the control means is driven;
- wherein the resistance body in the second member is selected so that the value of the time constant, which is primarily determined by the volume resistivity and dielectric constant of a material constituting the resistance body, becomes at least twice the time necessary for at least one of the first and second members to relatively move the distance corresponding to the length between the electrodes.

In other words, in the present invention, the second member consists basically of the resistance body alone, and the characteristics of this resistance body are set so that the time constant of charging or discharging the charge to and from the resistance body as the second member, when the voltage is applied or cut off to and from the belt-like electrodes disposed on the first member, becomes at least twice the time necessary for the second member to move the distance to be covered during each an operation cycle of the second member.

The volume resistivity of the resistance body in the present invention is from about $10^9$ to $10^{19}$ cm, and preferably from $10^{13}$ to $10^{15}$ cm.

The volume resistivity and dielectric constant of this resistance body are set so that their product, that is, volume resistivity×dielectric constant, as one of the factors of the time constant of the resistance body, becomes at least twice, particularly, and preferably 30 times the moving time.

In the present invention, if the portion of the second member disposed so as to face the first member having the belt-like electrodes, which faces the first member, is composed of the resistance body, preferably the resistance body having the volume resistivity of $10^9$ to $10^{19}$ cm, the charge pattern can be generated in the resistance body by driving the belt-like electrodes on the first member side.

The present invention is completed on the basis of experimental results that the second member can be moved by switching the voltage to be applied to the belt-like electrodes.

Therefore, it is not necessary in the present invention to constitute the moving member by the insulator layer and the high resistance body layer, as has been necessary in the prior art, and the structure can be simplified.

In the present invention, the first member and the second member maintain mutual surface contact and are kept stationary so long as they are not driven. When driven, however, both members separate from each other and are moved relative to each other. Therefore, mechanical elements such as bearings and the like, that have been necessary in the prior art, become unnecessary, so that the structure can be simplified and its dimension can be reduced.

In the present invention, further, the portion of the second member facing the first member is made of the resistance body and does not have the insulator layer. Accordingly, the belt-like electrodes can be brought close to this portion. Accordingly, a strong electric field is allowed to effectively act on the resistance body and the charge pattern can be generated within a short time.

Since the first member and the second member are allowed to move relative to each other in the present invention, the first member may be disposed stationarily while the second member may be disposed movably, or on the contrary, the first member may be constituted movably while the second member may be disposed stationarily. In the following embodiments of the present invention, the description will be primarily provided concerning the case where the first member is a fixed stationary member and the second member is a moving member moving along the stationary member, but the present invention is not particularly limited to this structure as already described.

Besides the structure described above, the technical feature of the present invention resides in the fact that the control means applies a pulse voltage to a plurality of belt-like electrodes, and is constituted so as to be capable of changing the pattern of the pulse voltage applied to the respective belt-like electrodes.

In other words, the present invention employs the structure described above on the basis of the finding that in order to generate the floating force between the first and second members and to generate the relative moving force between them, the use of a substantially discontinuous pulse voltages is necessary. For this reason, the relative movement in the present invention is essentially the intermittent operation. The present invention employs the structure in which the charge is once induced to the second member by driving the belt-like electrodes, then the pattern of the voltage is changed so as to generate the floating force and the driving force, and the first or second member is moved by a distance corresponding to the electrode pitch before the charge in the second member hardly changes. Accordingly, since the charge is almost fixed in the second member, the generation quantity of Joule heat is small and hence, an energy loss can be reduced.

The application pattern of the pulse voltage in the present invention is not particularly limited. The change of a pattern formed by three phase shown in a later-appearing FIG. 3 or the pattern formed by two phases shown in FIG. 36 may be utilized.

Next, in the present invention, the resistance characteristics of the resistance body constituting the second member must be limited to a specific value in order to accomplish the functions described above.

Therefore, in the present invention such resistance characteristics are specified as described above on the basis of the time constant $(\tau)$ at the time of charging and discharging the charge pattern to and from the resistance body. Such a time constant can be fundamentally expressed by [volume resistivity×dielectric constant], but when the thickness of the resistance body is considerably smaller than the electrode pitch, the formula [time constant=volume resistivity/thickness×electrode pitch×dielectric constant] is used.

In the case of an extremely thin resistance body such as a coating film, the volume resistance cannot be measured so easily, hence, its characteristics are evaluated by the surface resistivity. Particularly, in the case of a material which exhibits electric conductivity on the surface by absorbing the moisture in air such as ordinary antistatic agents, the volume resistivity cannot be defined. In such a case, therefore, the formula [time constant=surface resistivity×electrode pitch×dielectric constant] is used.

In the present invention, such a time constant $(\tau)$ is selected so as to be at least twice, preferably at least 30 times, the time necessary for at least one of the first and second members to move relatively by the distance corresponding to one pitch between the electrodes.

Next, the reason the time constant $(\tau)$ is set to be $\tau \geq 2t$ with respect to the moving time (t) described above will be explained. If the time constant $(\tau)$ is sufficiently great, the charge pattern of the moving member hardly changes when the floating force and driving force are applied to the moving member as the second member by switching the voltage, and the moving member moves the distance of the electrode pitch while the charge is kept stationary on the moving member.

On the other hand, if the time constant $(\tau)$ is so small as to be substantially equal to it, the charge moves before the movement of the moving member by one pitch is completed (before t). If $\tau$ becomes further smaller, the charge moves and the floating force and the driving force are lost before the moving member moves by one pitch, and the moving member stops within a short distance.

If the time constant $(\tau)$ is smaller than 2t, the moving speed generally becomes low and the charge moves inside the resistance body, so that the Joule heat is generated, the energy is lost and efficiency drops.

For the reasons described above, the relative movement can be attained at the maximum speed without allowing the charge inside the resistance body to move by setting the time constant ($\tau$) to at least 2t. Moreover, the energy loss can be minimized and efficiency can be improved.

Another embodiment of the present invention comprises the resistance body of the second member which is made of a photoconductive material, light irradiation means for irradiating light to the resistance body constituted by the photoconductive material so as to lower the resistivity of the resistance body, and control means constituted so as to apply a certain, predetermined pulse-like voltage pattern to a plurality of belt-like electrodes while the light irradiation means irradiate light to the resistance body, and to apply another pulse-like voltage pattern to the belt-like electrodes while the light irradiation means stops the irradiation of light to the resistance body. In other words, since a photoconductive material whose volume resistivity drops to 1/1000 to 1/10000 by the irradiation of light as the resistance body constituting the second member can be easily acquired, the time for generating the charge pattern can be shortened by using a photoconductive resistance body as the moving member, for example, and driving the belt-like electrodes while the light is irradiated to the resistance body. Accordingly, the time till the start of the movement of the moving member can be shortened.

BRIEF DESCRIPTION OF THE DRAWINGS

FIG. 1 is a perspective view of an electrostatic actuator utilizing a film in an embodiment according to the present invention;

FIG. 2 is a structural view of the electrostatic actuator;

FIG. 4 is a partial sectional view of the electrostatic actuator;

FIG. 5 is an explanatory view of a laminate type electrostatic actuator;

FIGS. 10(a) and 10(b) are explanatory views of an electrostatic actuator having a plurality of belt-like electrode groups;

FIGS. 34(a) to 34(c) are explanatory views of a production method of the belt-like electrodes;

FIG. 35 is an explanatory view of still another wiring method of the belt-like electrodes;

DESCRIPTION OF THE PREFERRED EMBODIMENTS

Figure 3A:
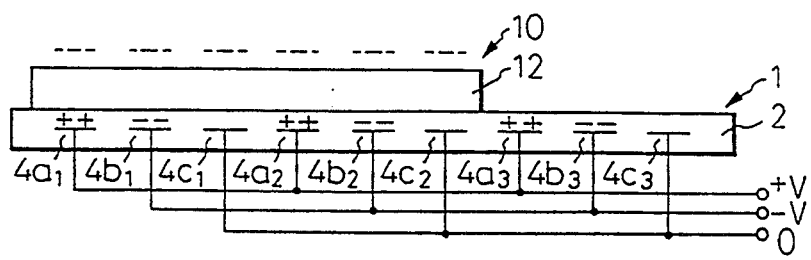
FIGS. 3(a) to 3(t) are explanatory views useful for explaining the operation of the electrostatic actuator.

Hereinafter, embodiments of the electrostatic actuator according to the present invention will be explained in detail with reference to the drawings.

FIGS. 1 to 3 are explanatory views useful for explaining the principle of the operation of an electrostatic actuator in accordance with the present invention.

As already described, either one of the first members having the belt-like electrodes and the second member consisting of the resistance body may be moved relative to the other in the present invention. However, the following explanation will be primarily given in the case where the first member is fixed and the second member is movable, for ease of explanation. For this reason, the term "stationary member" represents the first member and the term "moving member" represents the second member in the following description.

As shown in FIGS. 1 and 2, the stationary member 1 at the lower part is produced by burying a plurality of belt-like electrodes 4 in a dielectric 2.

On the other hand, the moving member 10 comprises a resistance body layer made of a thin film-like high resistance material, and is placed on the stationary member 1 while maintaining contact with the latter.

For instance, the width $l_1$ of the belt-like electrode 4 is 0.4 mm and its pitch $l_2$ is 1.27 mm. The total width $l_3$ in which the belt-like electrodes are disposed radially is 126 mm and the length of the belt-like electrode 4 is 175 mm.

On the other hand, there is disposed control means or controller 11 for applying a predetermined voltage to each of the belt-like electrodes.

Next, the operation of this electrostatic actuator will be explained with reference to FIG. 3.

First of all, as shown in FIG. 3(a), a positive voltage +V is applied to electrodes $4a_1$, $4a_2$, $4a_3$ as a first electrode group buried in the dielectric 2 that constitutes the stationary member 1. A negative voltage −V is applied to the electrodes $4b_1$, $4b_2$, $4b_3$ as a second electrode group, and 0 V is applied to the electrodes $4c_1$, $4c_2$, $4c_3$ as a third electrode group.

Then, charge concentrates on the high resistance body layer 12 due to the electric field which is generated at a position of the high resistance body layer 12 facing the belt-like electrodes at which the charge does not exist at the beginning.

The force of electrostatic attraction acts between the high resistance body layer 12 and the belt-like electrodes 4 and the friction between them keeps a stationary state.

Figure 3B:
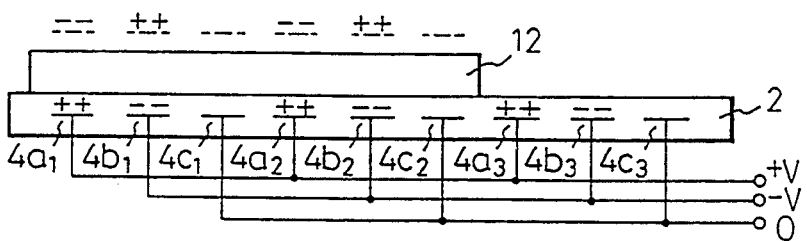

Incidentally, it is possible to imaginarily regard that the charge induced in the high resistance body layer exists at the position represented by dotted lines in FIG. 3(b). Therefore, this imaginary charge will be referred to as the "induced charge" in the following description.

Figure 3C:
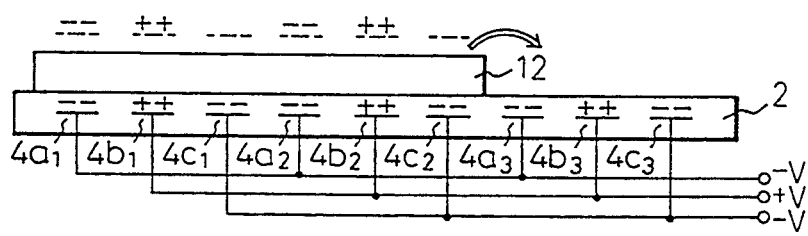

Next, the voltage to be applied to each electrode is switched as shown in FIG. 3(c).

In other words, the negative voltage −V is applied to the electrodes $4a_1$, $4a_2$, $4a_3$ as the first electrode group, the positive voltage +V, to the electrodes $4b_1$, $4b_2$, $4b_3$ as the second electrode group, and the negative voltage −V, to the electrodes $4c_1$, $4c_2$, $4c_3$ as the third electrode group.

Then the charge inside each electrode moves instantaneously but the charge induced in the high resistance body layer 12 cannot move very quickly because the resistance value of the high resistance body layer 12 is high.

Accordingly, the charges generated by the belt-like electrodes $4a_1$, $4b_1$, $4a_2$, $4b_2$ and the induced charge on the high resistance body layer 12 corresponding to each belt-like electrode have the same polarity, causing thereby the force of repulsion. Accordingly, the floating force or the force of repulsion in the floating direction acts on the high resistance body layer 12 as the moving member 10, and the frictional force is drastically reduced.

The negative charge of the electrode $4c_1$ and the positive induced charge on the electrode $4a_2$ attract each other and the negative charge of the electrode $4c_1$ and the negative induced charge on the electrode $4a_2$ repel each other, so that the moving member 10 moves to the right.

When the moving member 10 moves one pitch to the right, the charge of the electrode and the induced charge on the electrode come to have different polarities. Consequently, the force of attraction acts and the high resistance body layer 12 as the moving member 10 comes to a halt at that position.

Then, 0 V is applied to the electrodes $4a_1$, $4a_2$, $4a_3$ as the first electrode group, the positive voltage +V, to the electrodes $4b_1$, $4b_2$, $4b_3$ as the second electrode group and the negative voltage −V, to the electrodes $4c_1$, $4c_2$, $4c_3$ as the third electrode group.

Accordingly, the induced charge that has been diffused while the moving member 10 moves between the belt-like electrodes or in other words, by one pitch, is again induced (charged).

Next, the negative voltage −V is applied to the electrodes $4a_1$, $4a_2$, $4a_3$ as the first electrode group, the negative voltage −V, to the electrodes $4b_1$, $4b_2$, $4b_3$ as the second electrode group, and the positive voltage +V, to the electrodes $4c_1$, $4c_2$, $4c_3$ as the third electrode group.

Then, the charge of the electrode and the induced charge come to have the same polarity as has been explained with reference to FIG. 3(c) and due to the force of repulsion between them, the moving member 10 is driven to the right.

Figure 3D:
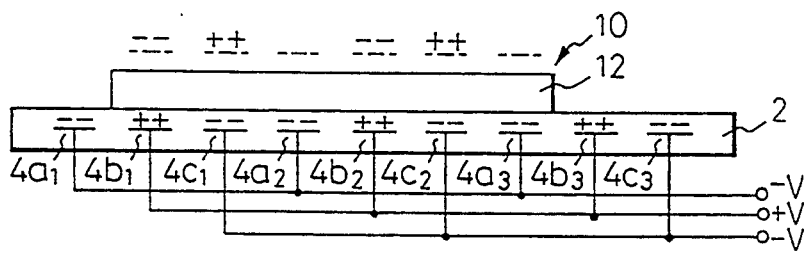
Figure 3E:
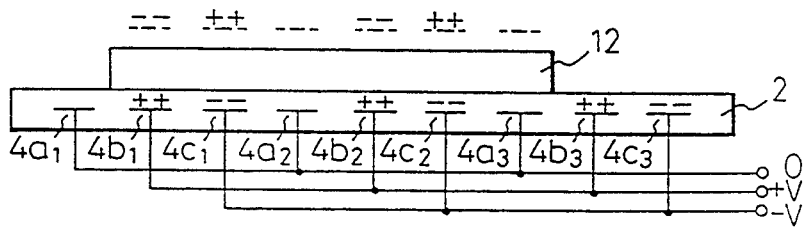
Figure 3F:
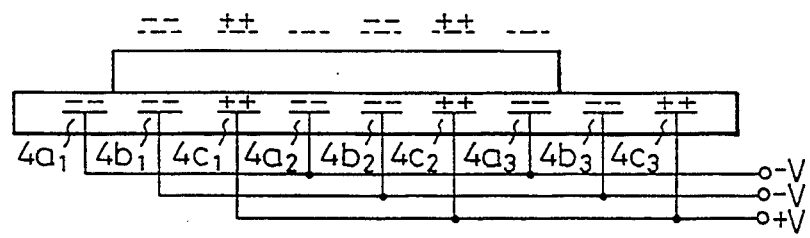
Figure 3G:
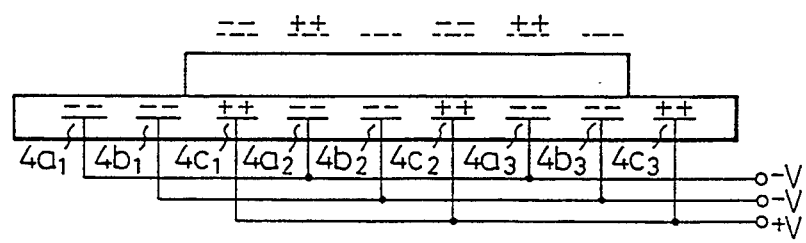

Thus the moving member 10 is positioned to the opposed position at which the charge of the electrode and the induced charge having different polarities, that is, the position deviated by one pitch by movement as shown in FIG. 3(g).

Figure 3H:
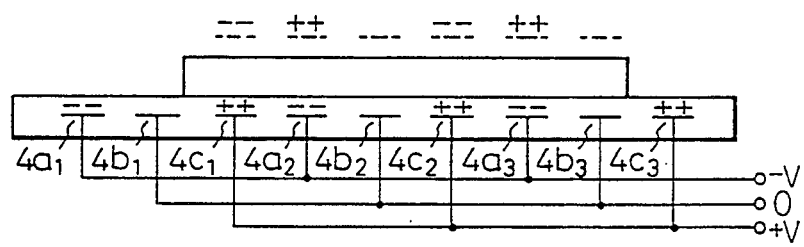

Next, when the voltage of the electrodes $4b_1$, $4b_2$, $4b_3$ as the second electrode group is set to 0 V from the state shown in FIG. 3(g) to the state shown in FIG. 3(h), the charge at these electrodes $4b_1$, $4b_2$, $4b_3$ becomes 0.

Figure 3I:
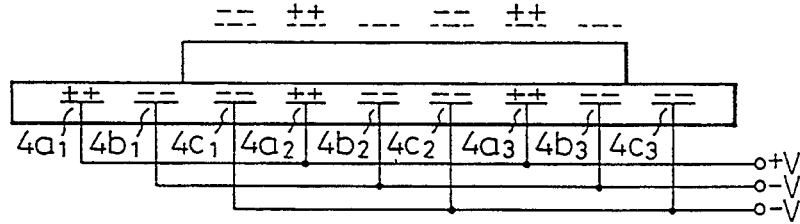

Thereafter the positive voltage +V is applied to the electrodes $4a_1$, $4a_2$, $4a_3$ as the first electrode group, the negative voltage −V to the electrodes $4b_1$, $4b_2$, $4b_3$ as the second electrode group and the negative voltage −V, to the electrodes $4c_1$, $4c_2$, $4c_3$ as the third electrode group, as shown in FIG. 3(i).

Then, as described already with reference to FIG. 3(c), the moving member 10 floats due to the force of repulsion and is driven to the right.

The moving member 10 is positioned to the opposed position at which the charge of the electrode and the induced charge become different polarities, or in other words, the position deviated by one pitch movement.

Figure 3J:
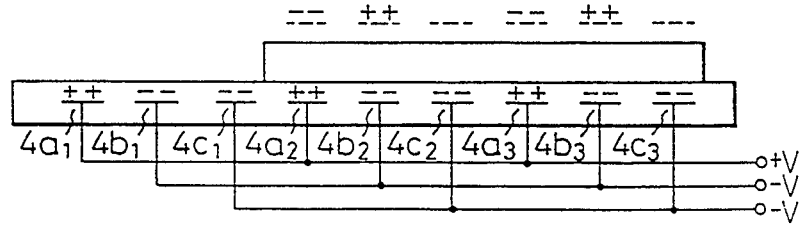
Figure 3K:
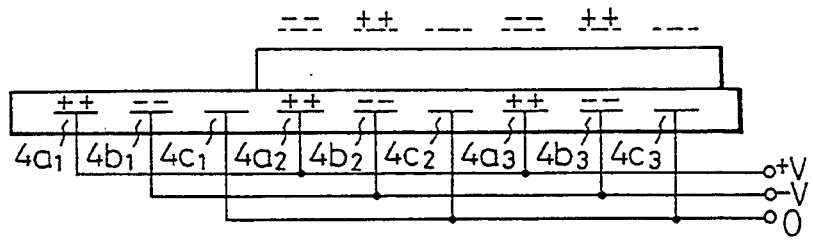

When the voltage of the electrodes $4c_1$, $4c_2$, $4c_3$ as the third electrode group is changed to 0 V from the state shown in FIG. 3(j) to the state shown in FIG. 3(k), the charge of these electrodes $4c_1$, $4c_2$, , $4c_3$ becomes 0.

Here, the high resistance body layer 12 as the moving member 10 can be moved by the same method.

Figure 3L:
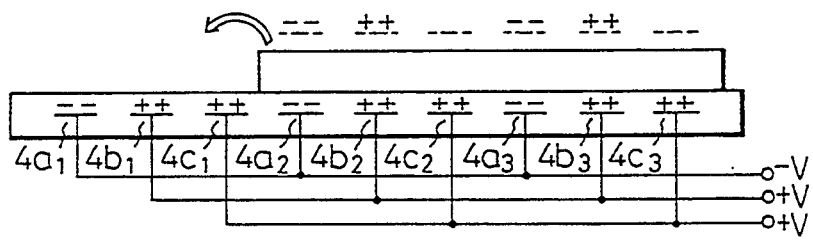

In other words, the negative voltage −V is applied to the electrodes $4a_1$, $4a_2$, $4a_3$ as the first electrode group, the positive voltage +V, to the electrodes $4b_1$, $4b_2$, $4b_3$ as the second electrode group, and the positive voltage +V, to the electrodes $4c_1$, $4c_2$, $4c_3$ as the third electrode group, as shown in FIG. 3(l).

Consequently, the charge of each belt-like electrode and the induced charge have the same polarity and due to the force of repulsion, the moving member floats and is driven to the left. It is then positioned at the position at which the charge of the electrode and the induced charge have different polarities, that is, the position deviated by one pitch movement.

Here, even if the moving member 10 attempts to move to the right, it cannot move to the right because the negative charge of the third electrode $4c_1$ and the negative induced charge on the first electrode $4a_2$ repel each other.

Therefore, the moving member 10 is sequentially moved one pitch to the left and is positioned as shown in FIGS. 3(n) to 3(t).

In the description given above, the electrodes disposed on the stationary member are shown arranged in only one direction, but they can be disposed in various forms as will be explained elsewhere.

The dimensions and pitches of the stationary member and moving member and the number of their steps can be selected appropriately.

Here, a definite structural example of the electrostatic actuator will be explained with reference to FIG. 4.

As shown in this drawing, the stationary member 1 is produced by forming by etching 100 belt-like electrodes 4 with gaps of 1.27 mm between them on a glass epoxy substrate 3, and covering them with an epoxy resin 5 and two 0.1 mm-thick PET (Polyethylene Terephthalate) films 6, 7 to obtain a dielectric 2.

Ordinary plain paper available commercially on the market is used as the moving member 10.

A voltage source for applying a voltage to the belt-like electrodes has V=1 (KV). The charging time (the time necessary for inducing the charge) is several seconds only at the initial stage but can be reduced down to one second from the second time and so on because the charge initially charged can be utilized.

When the voltage from the voltage source to each belt-like electrode is sequentially switched and applied to the electrode as has already been explained with reference to FIG. 3, the ordinary plane sheet placed on the stationary member 1 can be moved.

Next, a laminate type actuator obtained by laminating the afore-mentioned electrostatic actuators will be explained.

FIG. 5 is a perspective view of the actuator described above. The stationary member 20 includes a base portion 21 to be fixed, and a plurality of films 22–25 branched and extended from this base portion 21 and equipped with belt-like electrodes in a Y direction. Films 32–35 consisting of a plurality of thin film-like resistor bodies alone, which are connected to the base portion 31 to constitute the moving member 30, are placed on these films 22–25.

The volume resistance value of these films 32–35 is preferably from $10^9$ to $10^{11}$ cm and this value is $10^{13}$ to $10^{15}$ $\Omega$/square in terms of surface resistance.

Here, the moving member 30 can be moved in the X axis direction by applying the voltage to the belt-like electrodes disposed on the films 22–25 of the stationary member 20 in the voltage forms as shown in FIGS. 3(b) to 3(d), for example.

Figure 6:
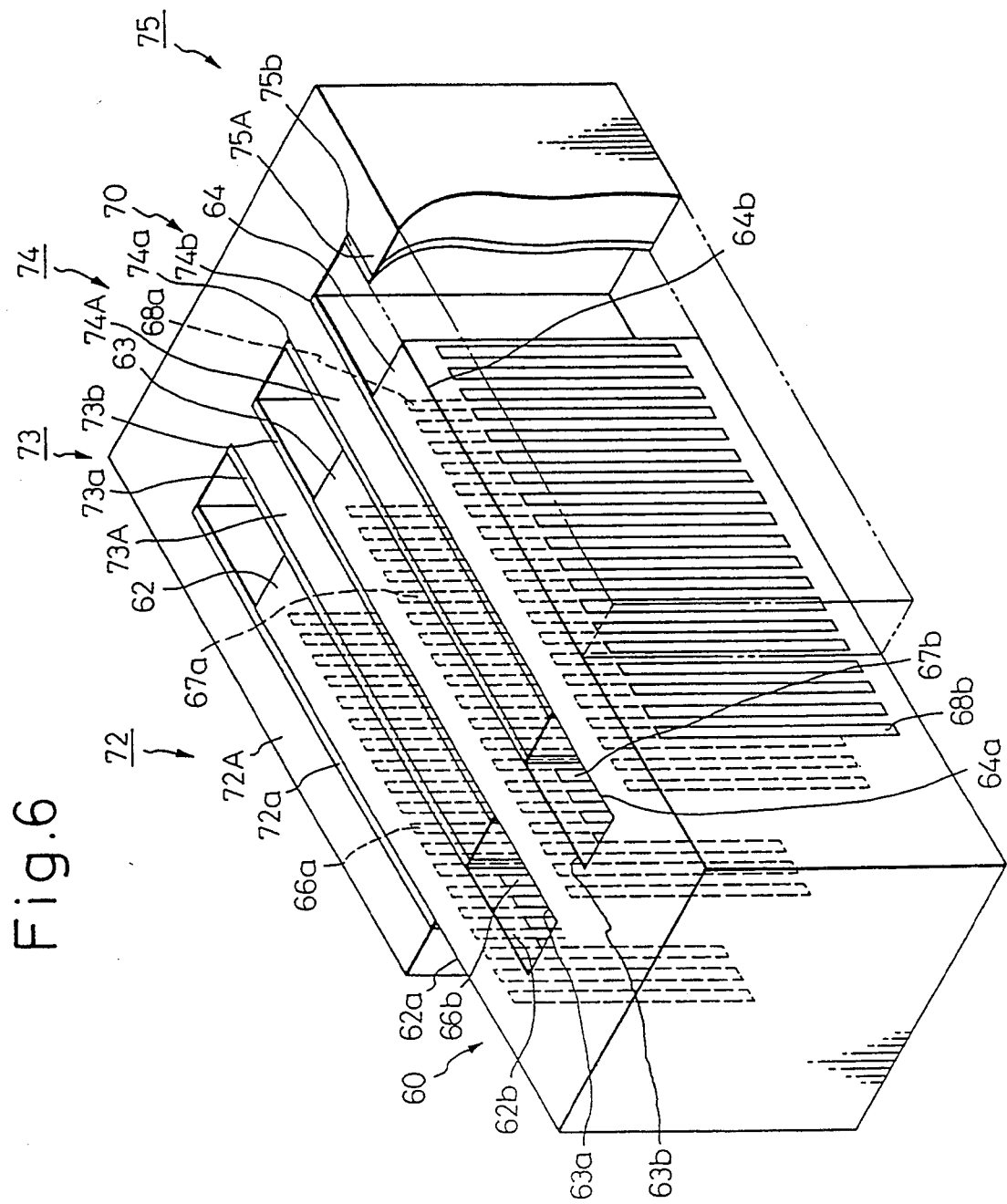
FIG. 6 is an explanatory view of another structure of the laminate type electrostatic actuator.

In this laminate type actuator, the belt-like electrode group 66a–68a is disposed in the proximity of one of the surfaces 62a–64b of the films 62–64 of the stationary member 60 and the belt-like electrode group 66b–68b is disposed in the proximity of the other surface 62b–64b as shown in FIG. 6.

On the other hand, the films 72–75 of the moving member 70 are insulating thin sheet-like members 72A–75A, and high resistance body layers 72a, 75b are bonded and fitted to one of the surfaces of the thin sheet-like member 72A and to the other surface of the thin sheet-like member 75A, respectively, as shown in FIG. 6.

The high resistance body layers 73a, 73b, 74a, 74b may be bonded and fitted to both surfaces of the thin sheet-like members 73A, 74A in the same way as described above, respectively.

Figure 7:
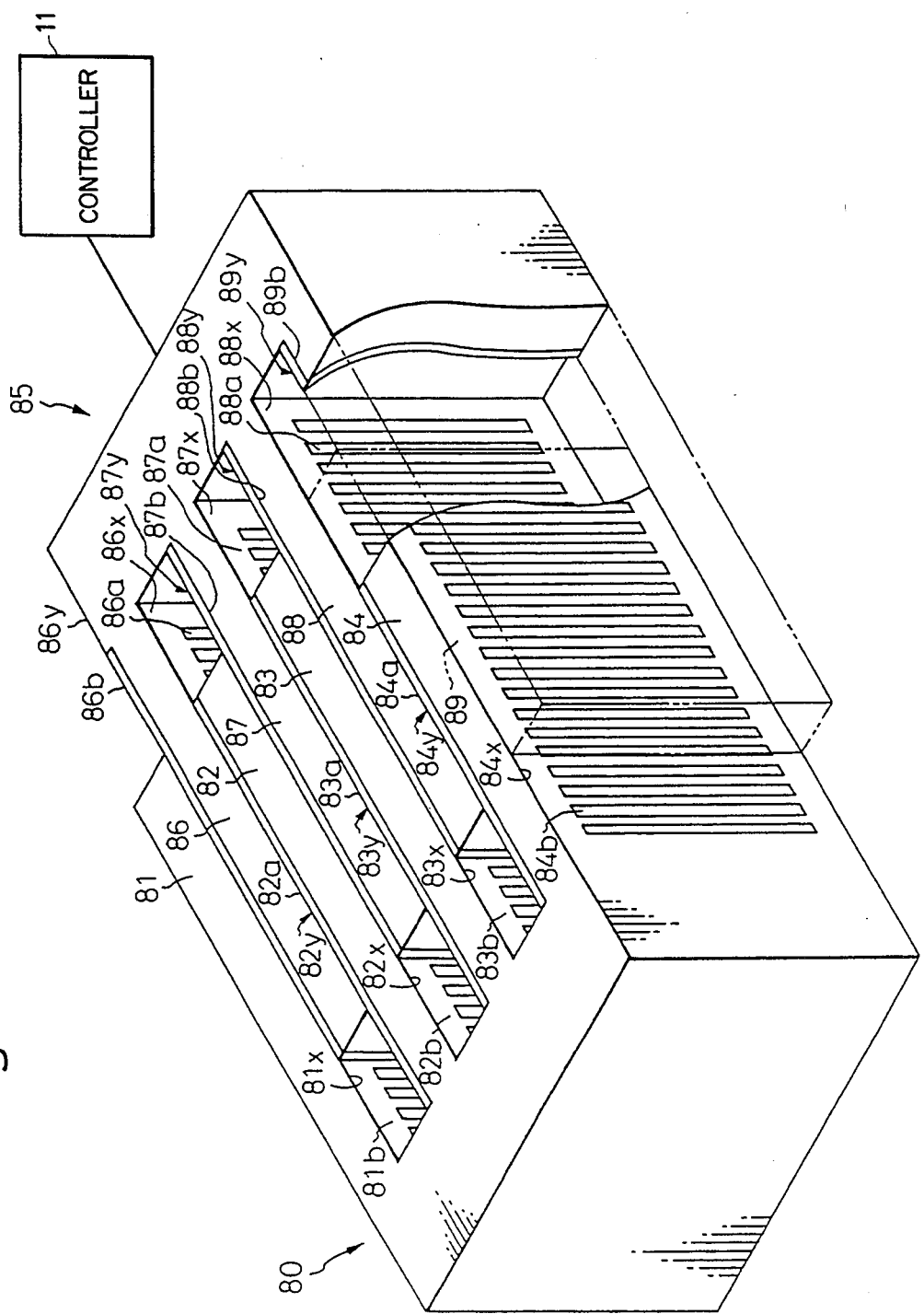
FIG. 7 is an explanatory view of still another structure of the laminate type electrostatic actuator.

Furthermore, this laminate type actuator may be constituted as shown in FIG. 7.

In other words, each film 81–84 of the stationary member 80 is made of an insulating material such as PET, the belt-like electrode group 81b–84b is buried in the proximity of one of the surfaces 81X–84X and the thin film-like high resistance body layers 82a–84a are bonded to the other surface 82y–82y, as shown in FIG. 7.

On the side of the moving member 85, too, each film 86–89 is made of an insulating material such as PET, the belt-like electrode group 86a–88a is buried in the proximity of one of the surface sides 86x–88x, and the high resistance body layers 86b–89b are bonded to the other surface side 86y–89y.

When the laminate type actuator having the construction shown in FIGS. 6 and 7 is employed, the power density can be improved much more than that of the laminate type actuator shown in FIG. 5.

Figure 8:
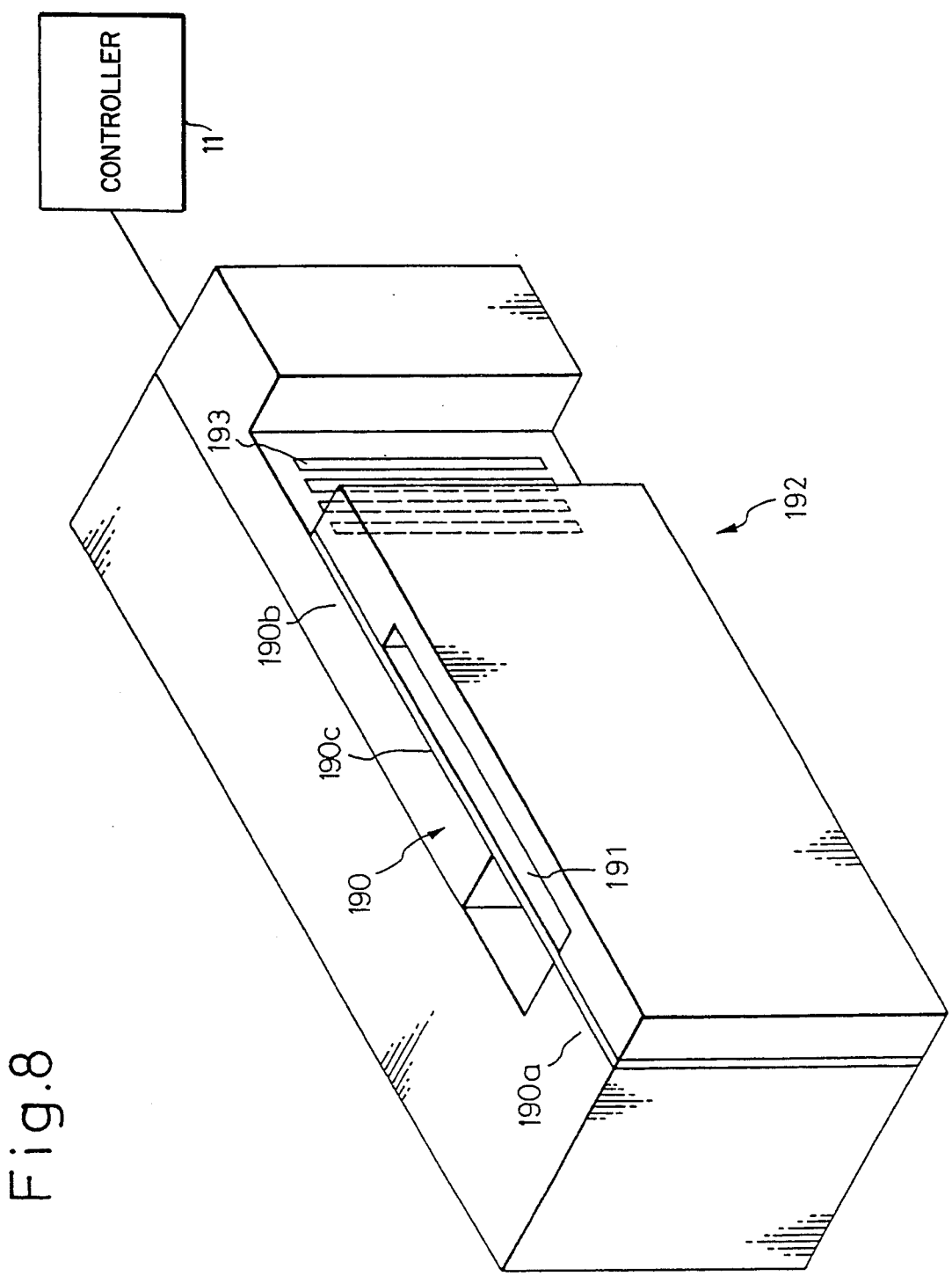
FIG. 8 is an explanatory view of a support structure of a second member in a laminate type electrostatic actuator.

Each film portion of the laminate type actuators shown in FIGS. 6 and 7 may be constituted as shown in FIG. 8 in order to prevent wrinkles of the high resistance body 190 as the moving member.

In other words, there is disposed a holding member 192 which holds both sides 190a, 190b of the high resistance body 190 and is composed of a rigid body having a recess 191, at the position corresponding to the intermediate portion 190c of the moving member corresponding to the high resistance body) 190, so that the high resistance body 190 can undergo deflection against the force of repulsion acting on the belt-like electrode group 193.

According to this arrangement, the high resistance body 190 is always provided with tension. Hence, the wrinkles can be prevented.

The resistance body(ies) of the present invention (for example, the moving member 10 of FIGS. 1–5, the films 32–35 of FIG. 5, the high resistance body layers 72a, 73a, 73b, 74a, 74b and 75b of FIG. 6, the high resistance body layers 82a, 83a, 84a, 86b, 87b, 88b, 89b of FIG. 7, and the high resistance body 190 of FIG. 8) can be predetermined so that a value of the time constant of the resistance body(ies) determined primarily by the volume resistivity and dielectric constant of a material constituting the resistance body(ies), is twice or more of a time necessary for the resistance body(ies) to move a distance corresponding to a length between the belt-like electrodes.

Figure 9:
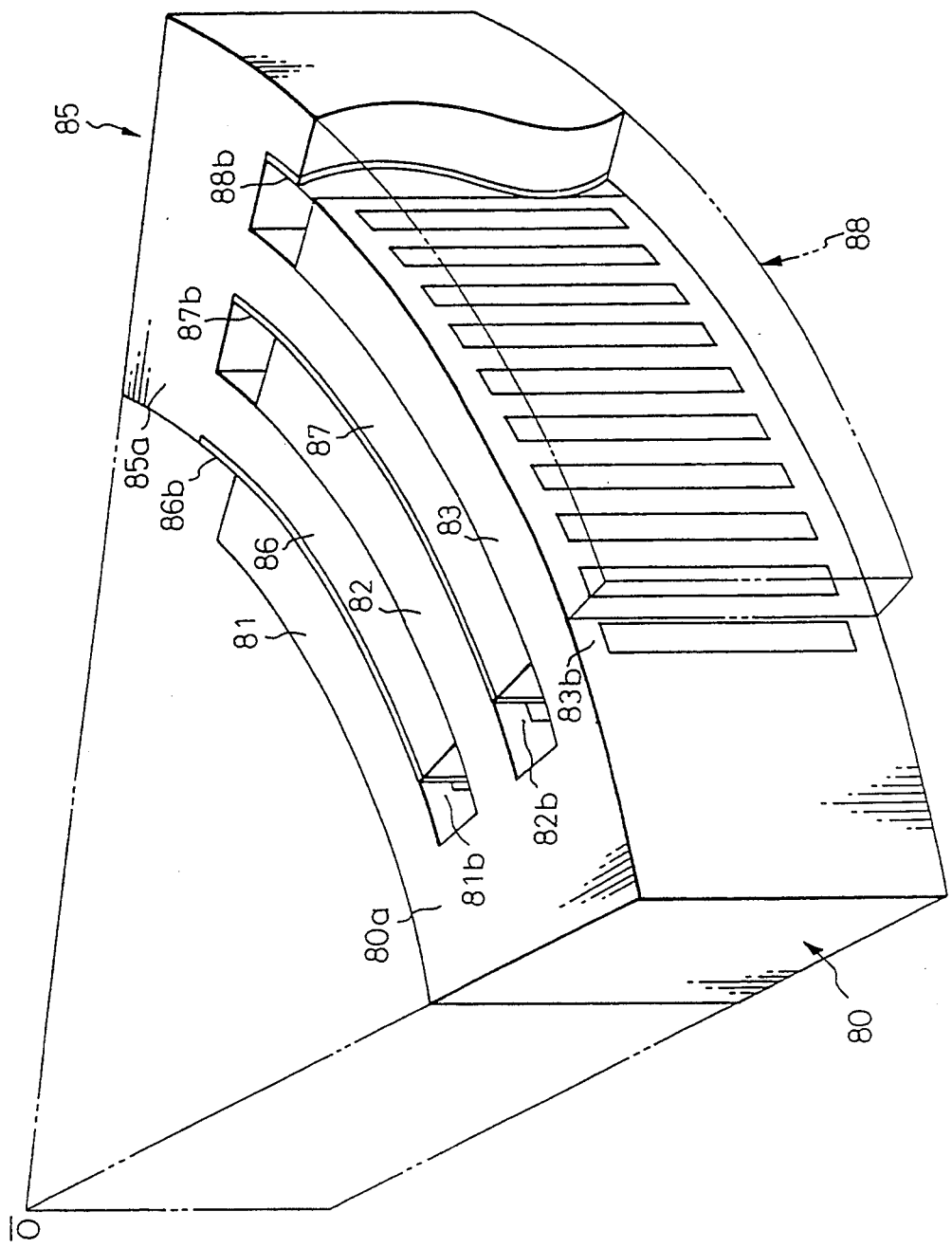
FIG. 9 is an explanatory view of still another structure of the laminate type electrostatic actuator.

Incidentally, these laminate type actuators can be applied not only to the straight movement type but also to a rocking type by constituting the stationary member 80 and the moving member 85 in the curved form with the center O of the radius of curvature being the center as shown in FIG. 9.

In this case, the film portions 81–83 extending from the distal portion side 80a of the stationary member 80 are shaped in the arc form having their center O at the center of the radius of curvature, and the film portions 86–88 extending from the distal side portion 85a of the moving member 85 are shaped likewise in the arc shape having their center O at the center of the radius of curvature, with the thin film members 86b–88b, in the same way as in the stationary member 80.

It is also possible to form the belt-like electrodes which are wired to the stationary member in the X and Y axis directions.

Figure 10A:
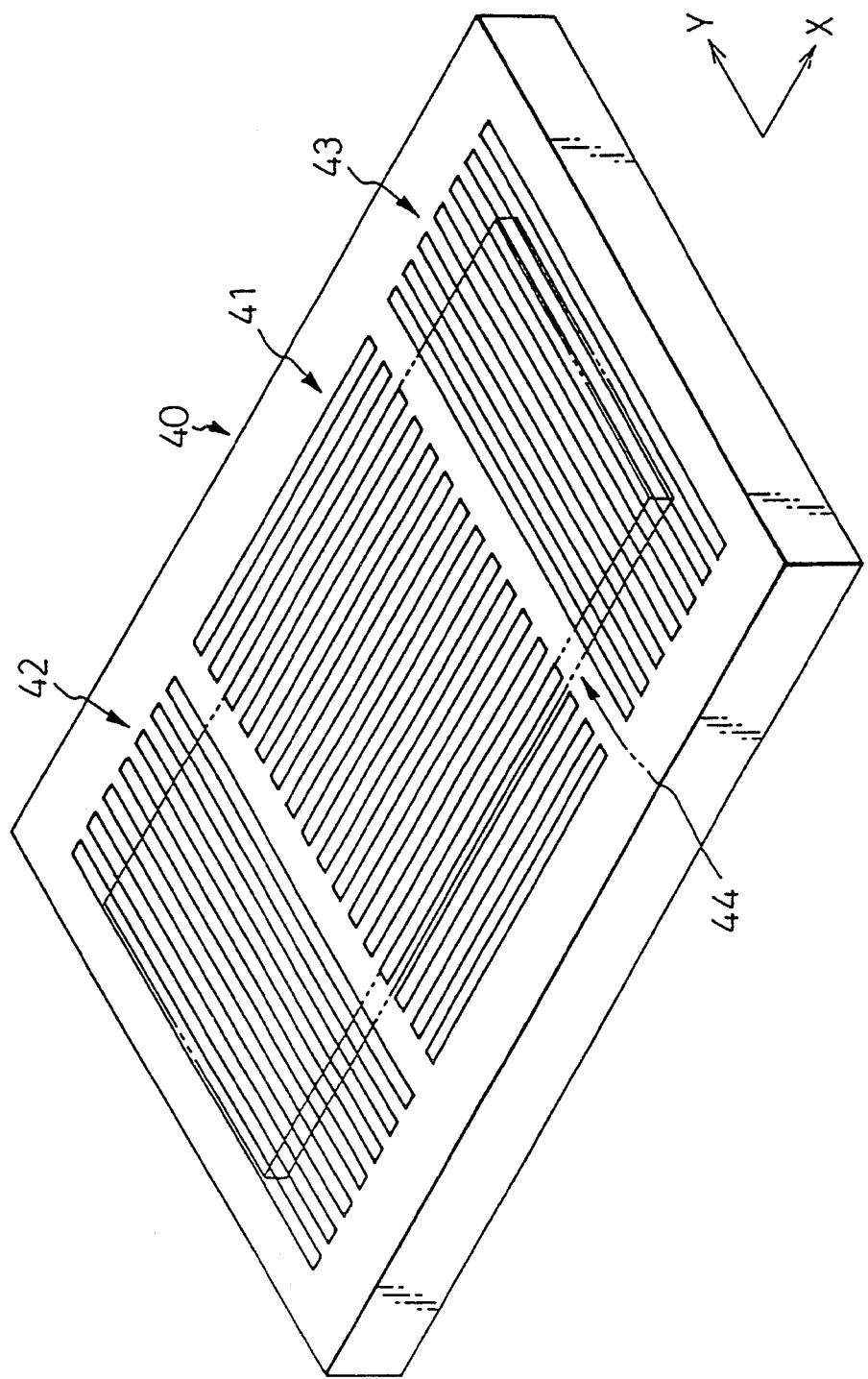

For example, as shown in FIG. 10(a), the belt-like electrodes 41 to be wired in the X axis direction and the belt-like electrodes 42, 43 to be wired in the Y axis direction are disposed on the stationary member 40.

Switching of the voltage to each of the belt-like electrodes 41–43 is individually made and in this way, the moving member 44 placed on them can be driven in the X axis direction and/or in the Y axis direction.

As shown in FIG. 10(b), the belt-like electrodes 46, 47 to be wired in the X axis direction and the belt-like electrodes 48 to be wired in the Y axis direction may be disposed on the stationary member 40.

Figure 11A:
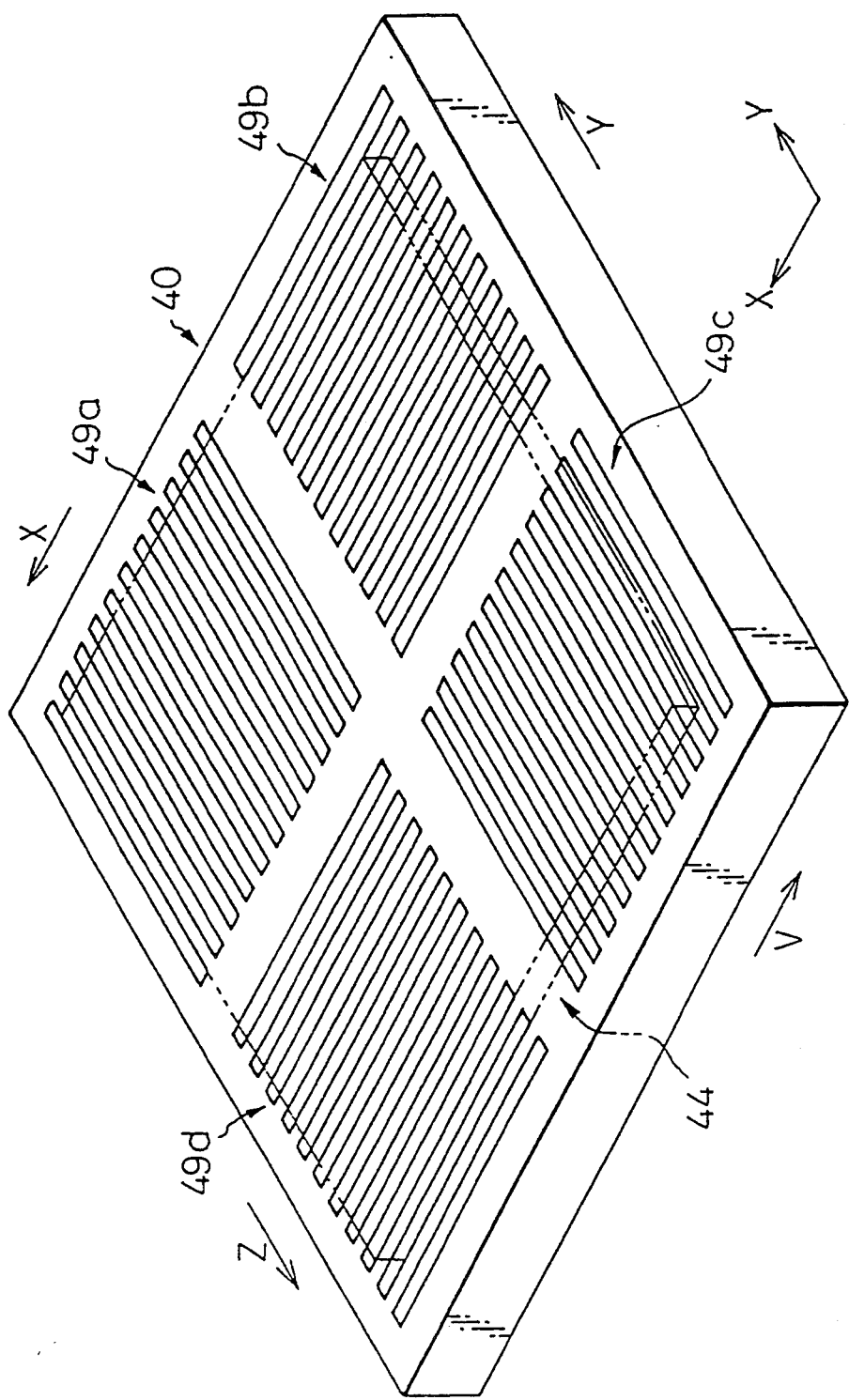
FIGS. 11(a) to 11(c) are explanatory views of another structure of the electrostatic actuator having a plurality of belt-like electrode groups.
Figure 11B:
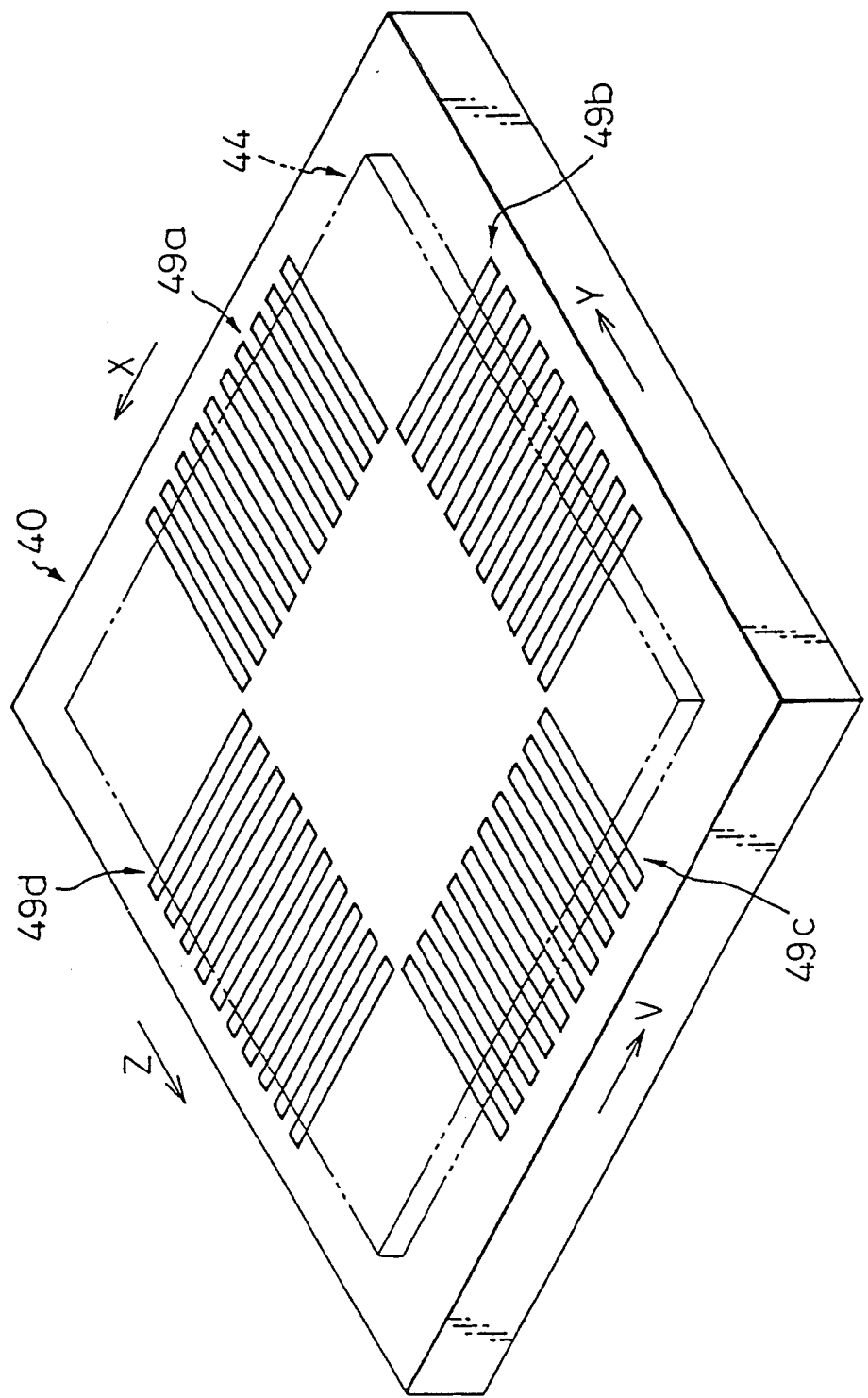

Furthermore, as shown in FIGS. 11(a), (b) and (c), the belt-like electrodes 49a–49b are disposed on the flat sheet stationary member 40, and the voltage patterns for these belt-like electrodes 49a–49b are allowed to be individually switched.

According to this arrangement, the moving member 44 can be moved in the X axis direction by driving only the belt-like electrodes 49a, 49c.

The moving member 44 can be moved in the Y axis direction by driving only the belt-like electrodes 49b, 49d.

The moving element 44 can be moved in both X and Y directions by driving both of the belt-like electrodes 49a, 49c and the belt-like electrodes 49b, 49d.

Furthermore, the moving member 44 can be rotated by switching the voltage patterns in such a manner as to drive the belt-like electrodes 49a–49b in the V–Z directions represented by arrows, respectively.

Figure 11C:
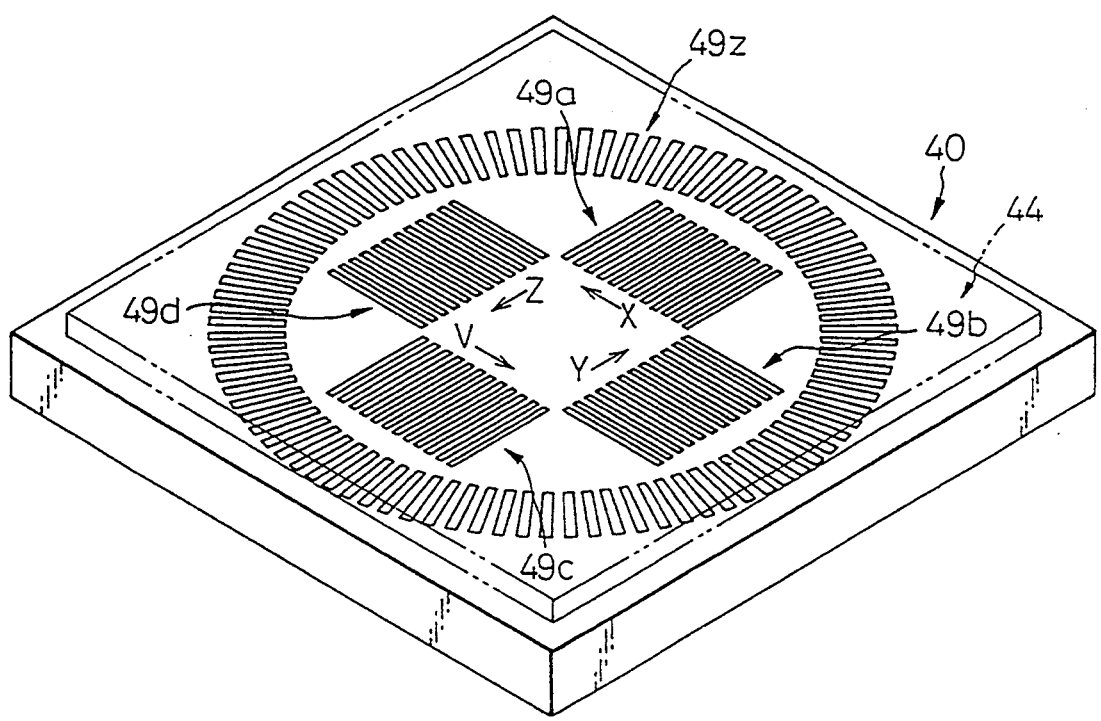

Incidentally, as shown in FIG. 11(c), it is possible to dispose radially the belt-like electrodes 49d as shown in FIG. 11(c), and to rotate the moving member 44 by switching the voltage patterns to these belt-like electrodes 49z.

Furthermore, it is possible to shape the stationary member 50 in the disc form and to use only radial electrodes 49z as the belt-like electrodes as shown in FIG. 12.

In this case, the moving member 44a on the disc, the ring-like moving member 44b, the fan-shaped moving member 44c, the fan-shaped moving member 44d having a center shaft $44d_1$ rotatably supported by a bearing, not shown, at the position of the center of rotation, and the curved flat sheet 44e can be rotated or rocked in the direction represented by arrow A as shown in FIGS. 12(a) to 12(e).

Figure 12A:
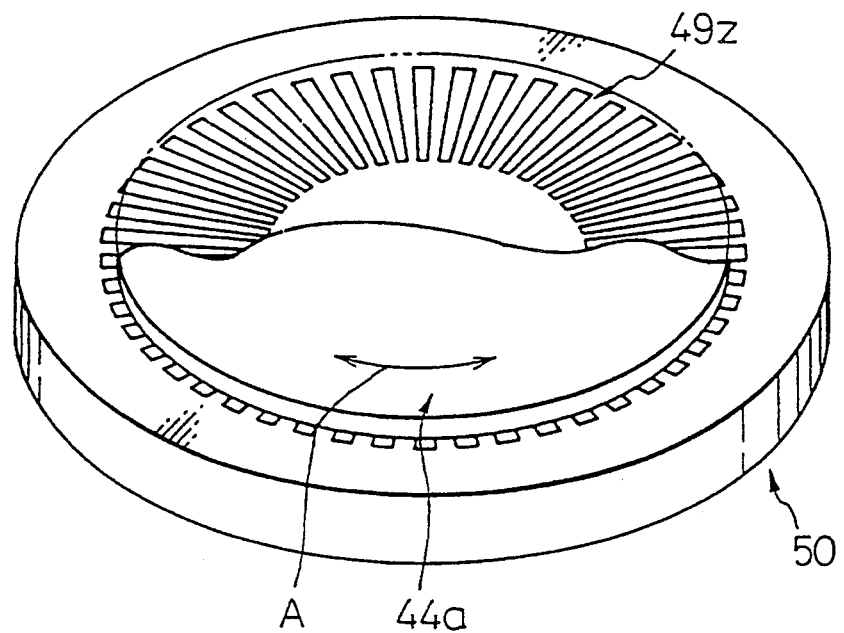
FIGS. 12(a) to 12(e) are explanatory views of an electrostatic actuator having a plurality of belt-like electrodes disposed radially.
Figure 12B:
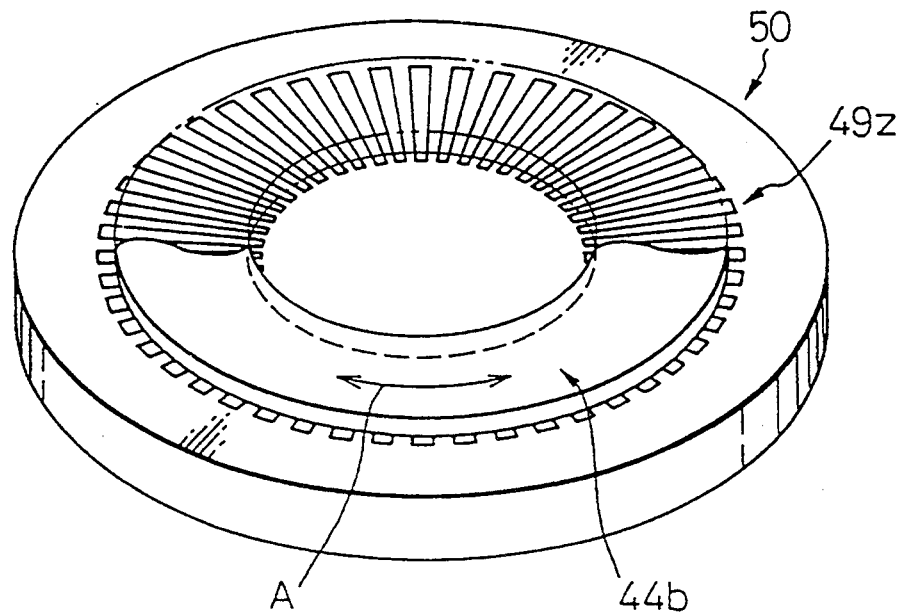
Figure 12C:
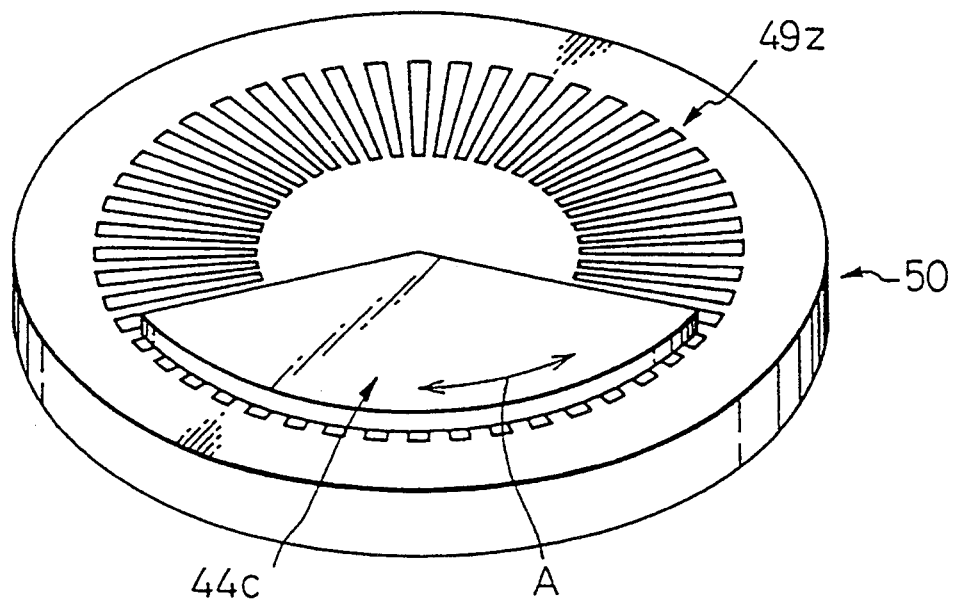
Figure 12D:
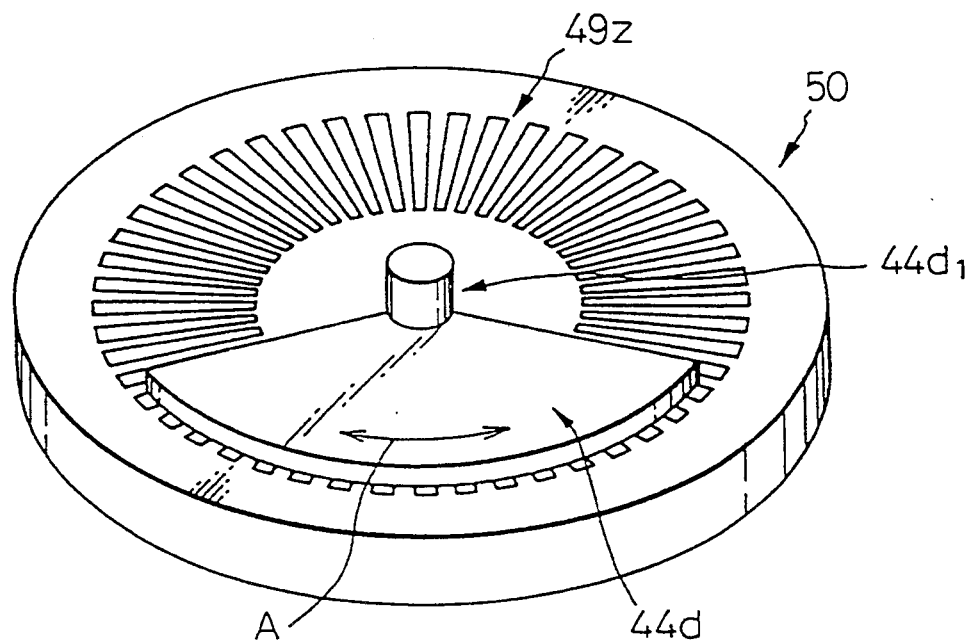
Figure 12E:
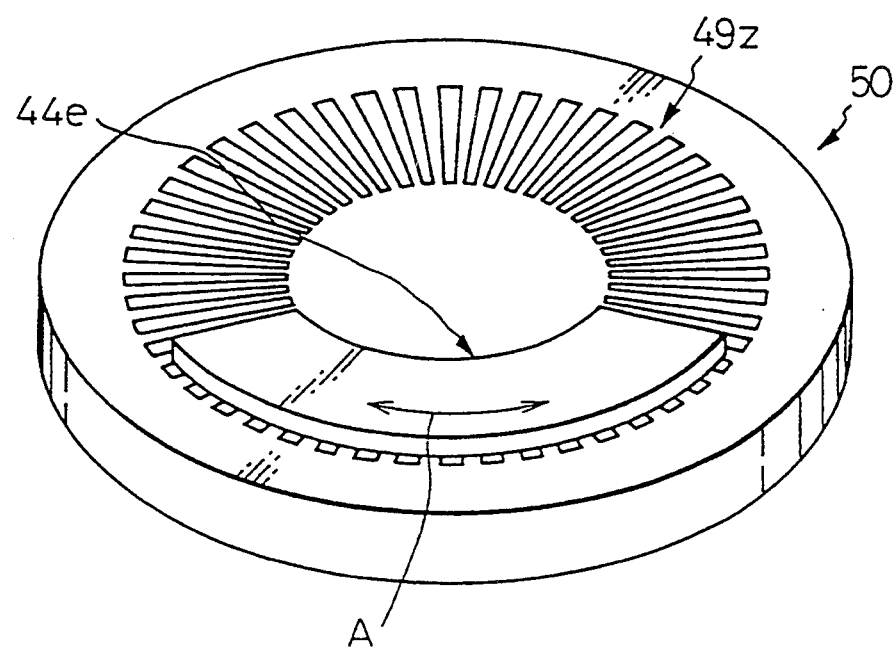
Figure 13A:
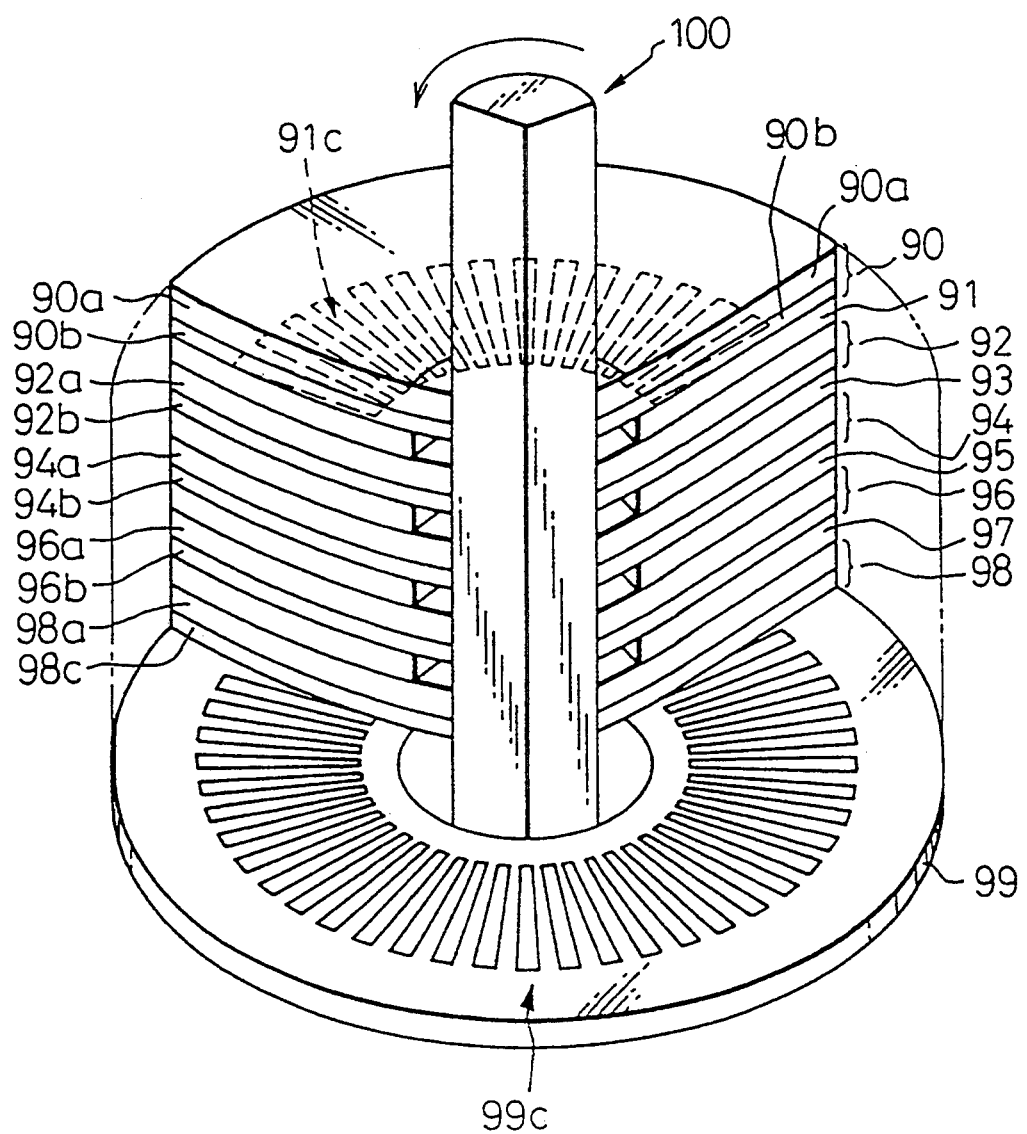
FIGS. 13A and 13B are explanatory views of a laminate type electrostatic actuator having belt-like electrodes disposed radially.
Figure 13B:
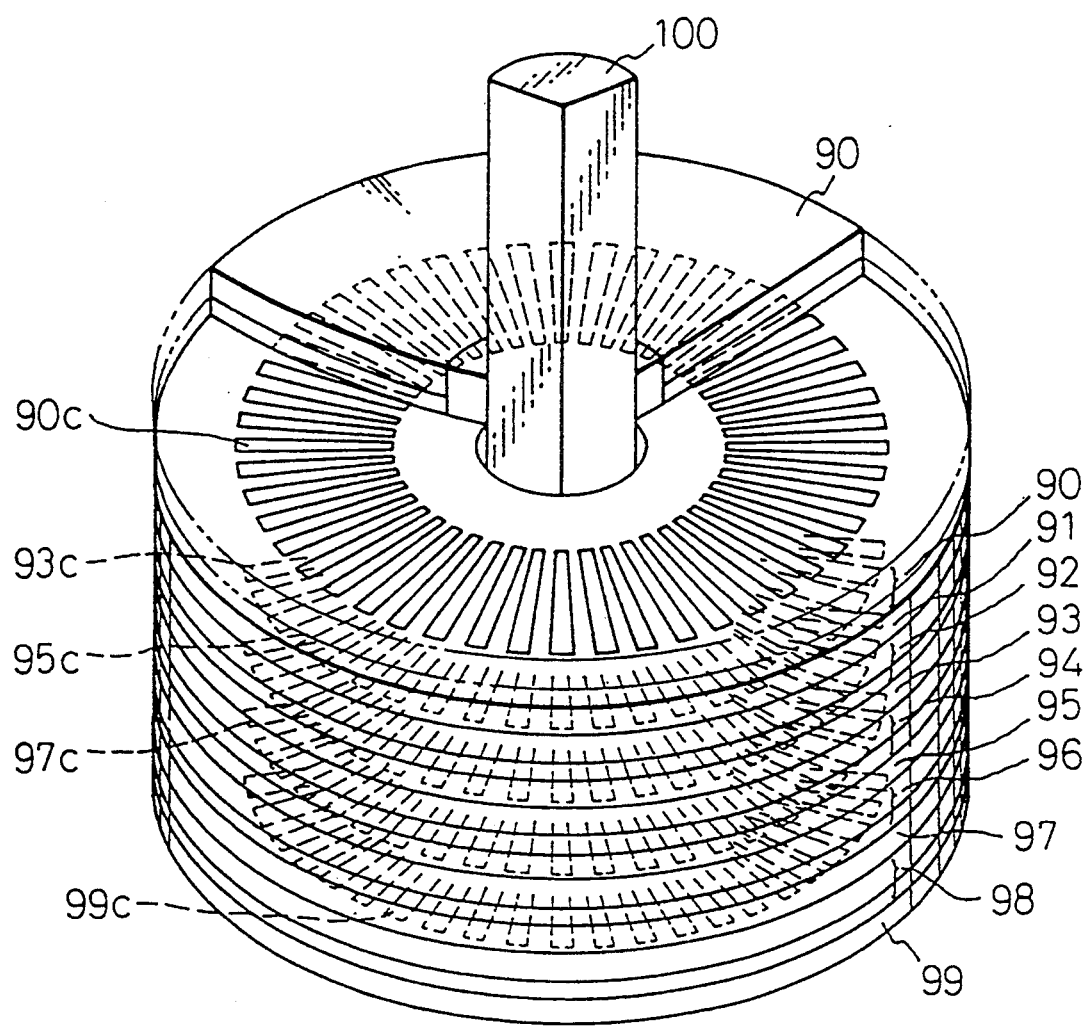

FIG. 13 shows the case where the rotary type shown in FIG. 12(a) is constituted as a laminate type.

In the drawing, a plurality of discs 90–99 made of an insulating and flexible material such as PET is shown laminated, and each of the discs 90, 92, 94, 96, 98 includes a main body portion 90a, 92a, 94a, 96a, 98a and a high resistance body layer 90b, 92b, 94b, 96b, 98b which is bonded to the lower surface side of the main body portion. In another embodiment, each of the main body portions 90a–98a may be the high resistance body layer while each of the portions 90b–98b may be composed of the insulating material layer. On the other hand, belt-like electrodes 91c, 93c, 95c 97c, 99c are radially disposed on each of the discs 91, 93, 95, 97, 99 in the proximity of the surface which opposes and comes into contact with the afore-mentioned high resistance body layer, respectively.

The discs 90, 92, 94, 96, 98 are fixed to a shaft 100, while the discs 91, 93, 95, 97, 99 are supported rotatably with respect to this shaft 100, but the latter are fixed by a suitable fixing member which is not shown in the drawing.

A voltage from a voltage pattern switching device, not shown in the drawing, is individually applied to each of the belt-like electrodes 91c–99c by the use of a slide contact, or the like, through a hollow portion of the shaft 100.

In the construction described above, when the voltage patterns to be applied to the belt-like electrodes 91c, 93c, 95c, 97c, 99c of the discs 91, 93, 95, 97, 99 are switched, the discs 90, 92, 94, 96, 98 are allowed to displace stepwise with respect to the stationary discs 91, 93, 95, 97, 99. At this time, the discs 90, 92, 94, 96, 98 rotate altogether and cause rotating displacement of the shaft 100.

Next, when the voltage patterns to be applied to the belt-like electrodes 91c, 93c, 95c, 97c, 99c are switched, the rotary discs 90, 92, 94, 96, 98 are allowed to displace stepwise with respect to the fixed discs 91, 93, 95, 97, 99. The shaft 100 can be rotated by sequentially repeating these operations.

In the embodiments of the present invention described above, it is of course possible to fix the discs 91, 93, 95, 97, 99 having the belt-like electrodes to the shaft 100 and to rotate the shaft 100, as already described.

In this case, the sliding contacts for applying the voltages to the belt-like electrodes 91c–99c can be omitted, and each disc 92, 94, 96, 98 is fitted at its outer periphery to a fixing portion which is not shown in the drawing.

Figure 14:
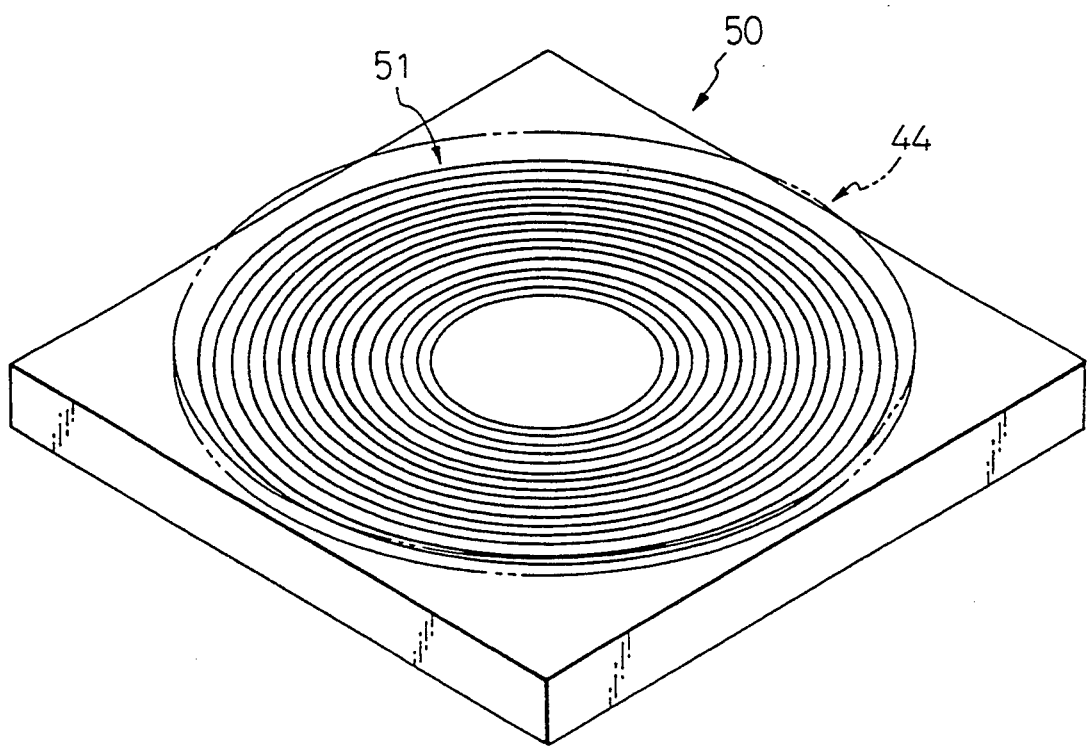
FIG. 14 is an explanatory view of a structure for imparting a tension to a second member by disposing belt-like electrode in a ring-like form.

Furthermore, ring-like belt-like electrodes 51 are disposed concentrically on the stationary member 50 as shown in FIG. 14.

Though not shown in the drawing, a wrinkled round film (moving member) 44, for example, is placed on this stationary member 50. When a voltage which drives the film 44 in the radial direction is applied to the belt-like electrodes 51, the wrinkles of the film 44 can be smoothened.

Figure 15:
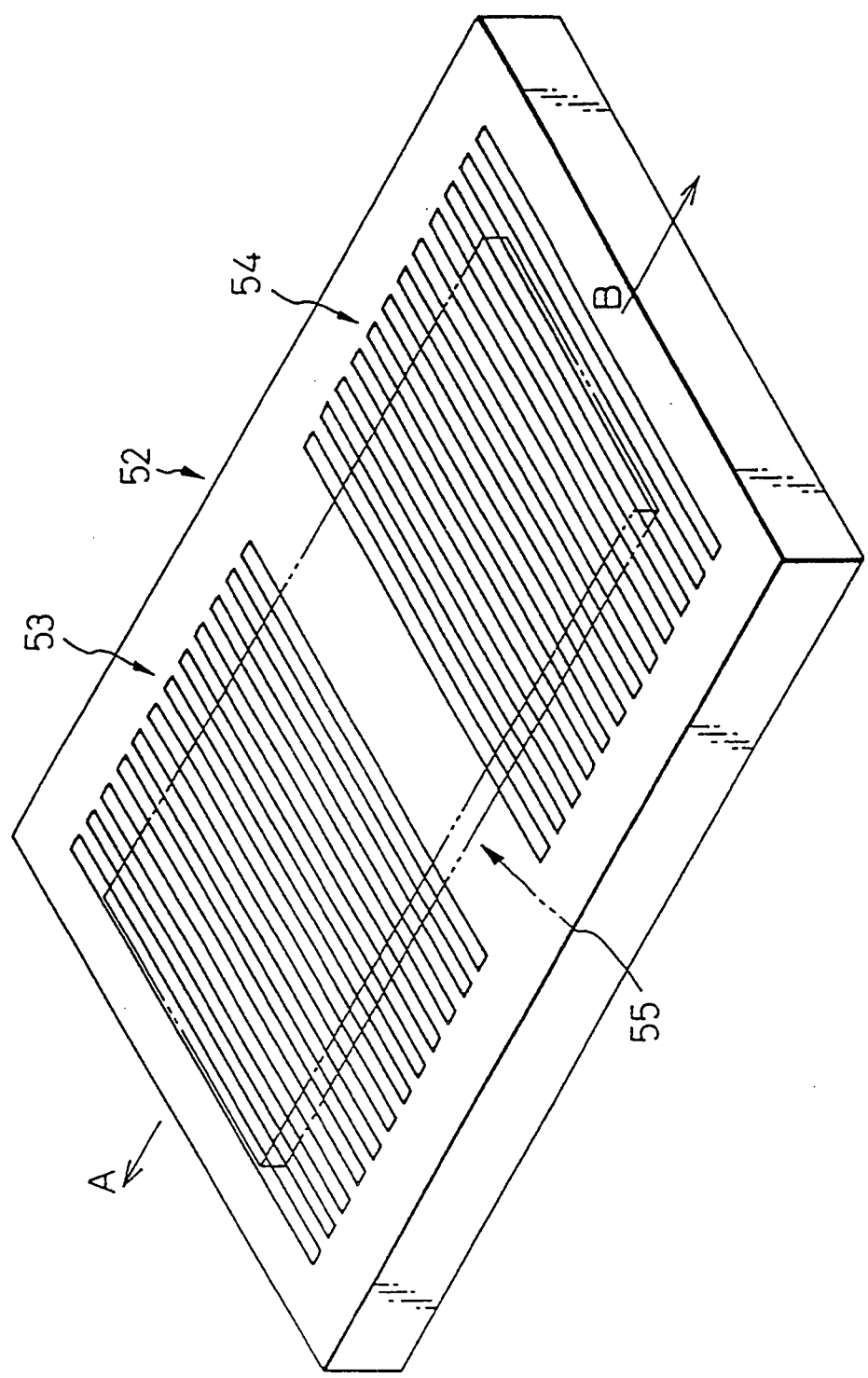
FIG. 15 is an explanatory view of a structure for imparting a tension to the second member by disposing the belt-like electrodes in parallel with one another.

This wrinkle smoothening function can be achieved also in the following way. As shown in FIG. 15, the belt-like electrodes 53, 54 are juxtaposed on the stationary member 52. The wrinkled moving member 55 is placed on the stationary member 52. The voltage patterns which give the moving force to the moving member 55 in the direction of arrow A for the belt-like electrodes 53 and in the direction of arrow B for the belt-like electrodes 54 are applied, and in this manner, the longitudinal and transverse wrinkles of the moving member 55 can be smoothened.

This wrinkle smoothening function can also be accomplished by individually driving the belt-like electrodes 42, 43 shown in FIG. 10(a).

Figure 16:
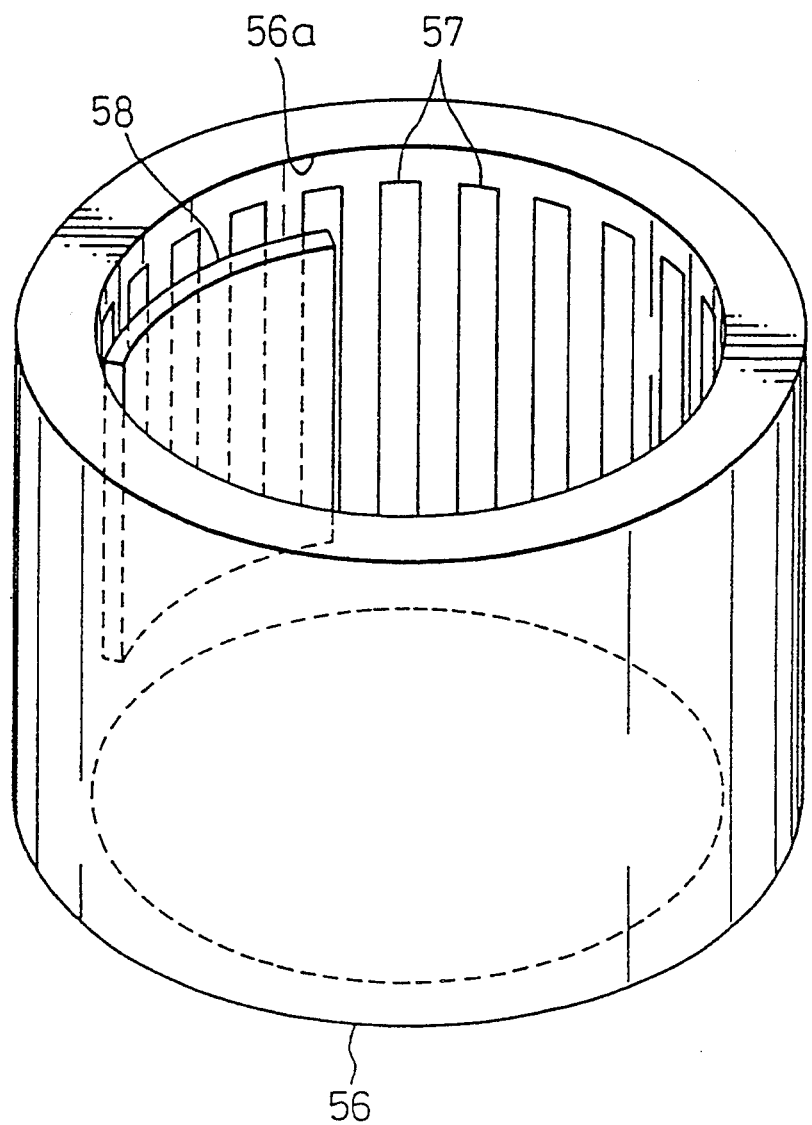
FIG. 16 is a structural explanatory view of a cylindrical electrostatic actuator.

FIG. 16 shows an embodiment wherein the stationary member is a cylindrical stationary member 56. In this cylindrical stationary member 56, the electrodes 57 such as those shown in FIGS. 2 and 3 are buried in the axial direction of the cylindrical stationary member 56.

The film-like moving member 58 is disposed on the inner surface side 56a of the cylindrical stationary member 56. As described already, this moving member 58 consists of the flexible film such as PET, and for this reason, the moving member 58 can deflect by itself in such a manner as to extend along the inner surface of the cylindrical stationary member 56.

When the construction described above is employed and the voltage pattern to each electrode 57 is switched as has already been explained with reference to FIG. 3, the moving member 58 can be moved along the inner surface of the cylindrical stationary member 56.

When one of the end portions of this moving member 58 is bonded or fastened by a screw, or the like, to a shaft (not shown) which is rotatably supported, the electrostatic actuator shown in FIG. 16 can be changed to a rotary actuator capable of rotating this shaft. Incidentally, when this rotary actuator is constituted, too, a greater force can be generated by constituting the cylindrical stationary member 56 and the moving member 57 in the laminate type such as the one shown in FIG. 5.

Figure 17:
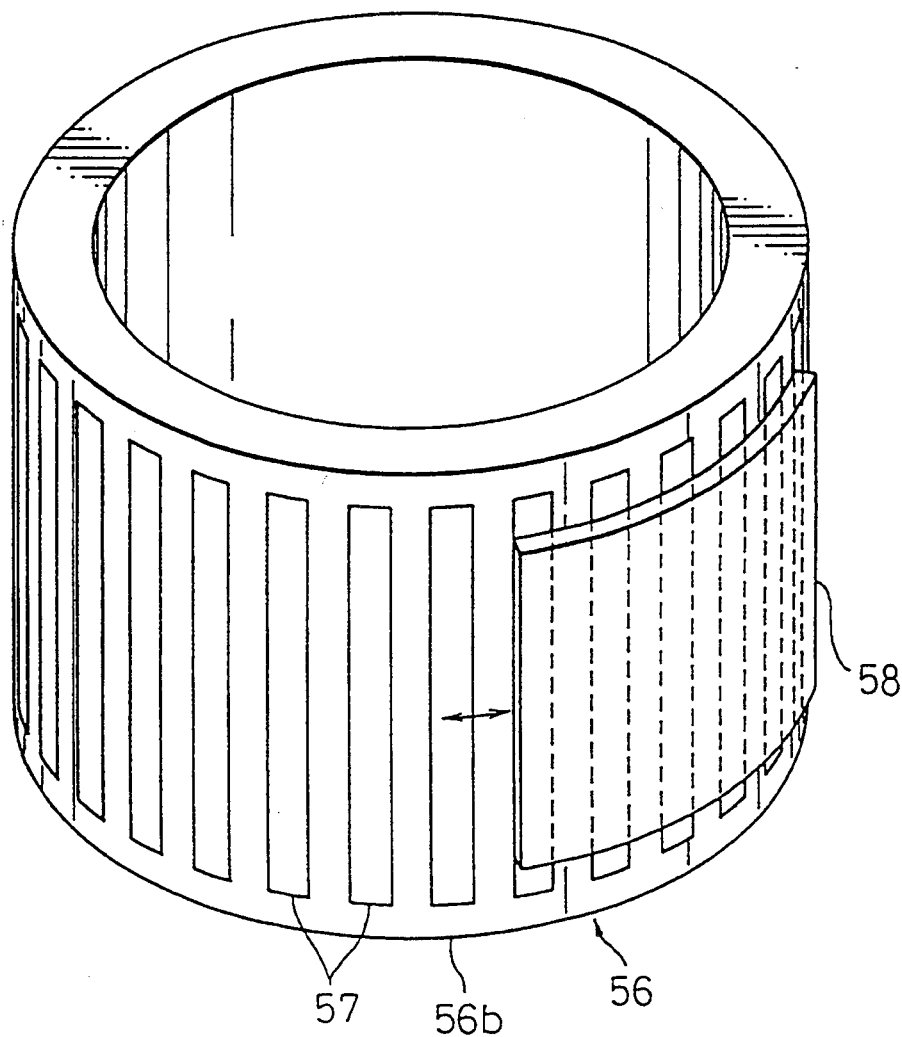
FIG. 17 is a structural explanatory view of another structure of the cylindrical electrostatic actuator.

Furthermore, the construction in which the moving member 58 is disposed on the outer peripheral surface side 56b of the cylindrical stationary member 56 may be employed as shown in FIG. 17, and the construction in which the moving force of this cylindrical stationary member 56 is allowed to act on the inner peripheral surface side 56a and outer peripheral surface side 56b of the cylindrical stationary member 56.

Figure 18:
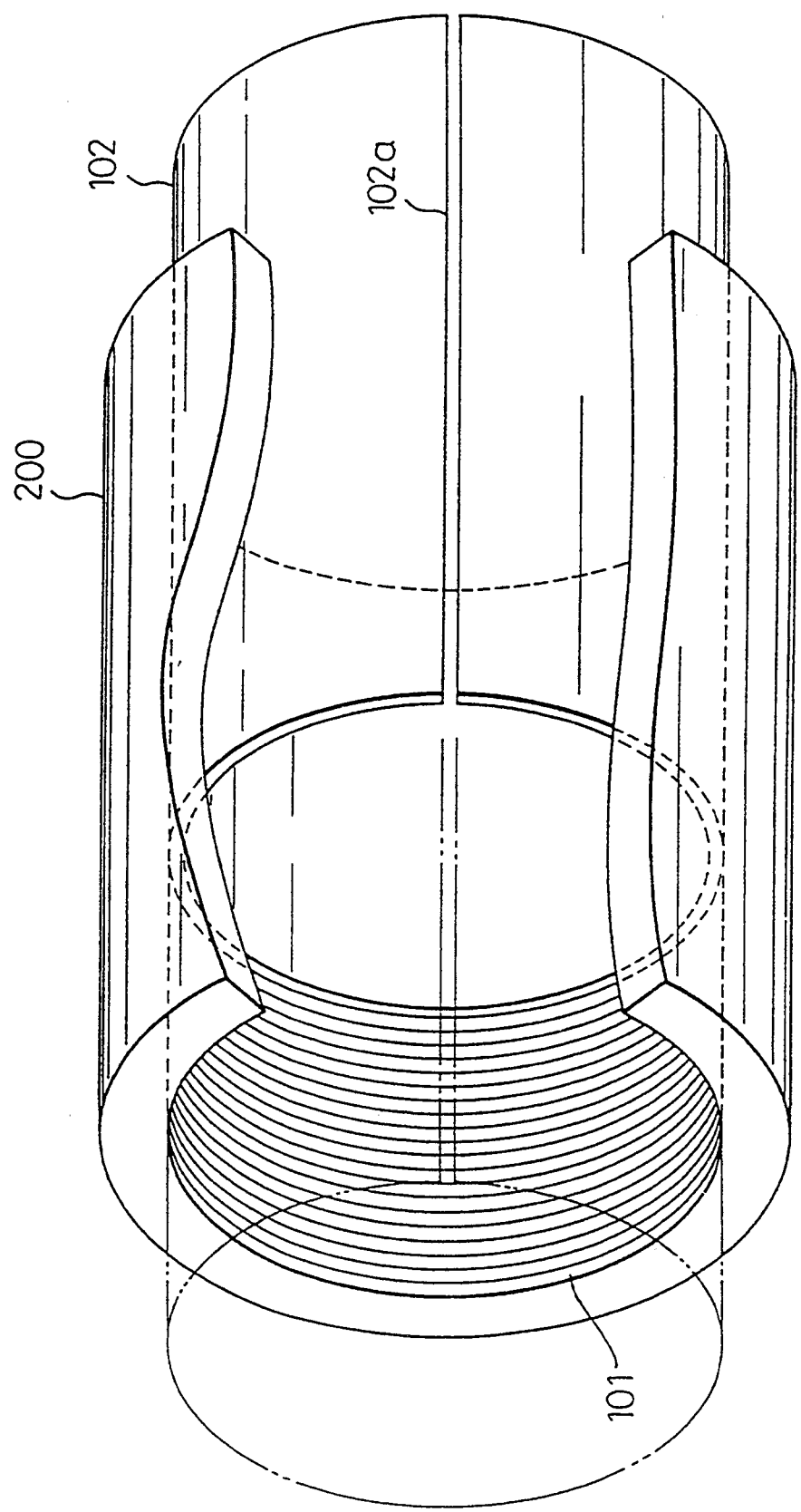
FIG. 18 is a structural explanatory view of still another structure of the cylindrical electrostatic actuator.

As shown in FIG. 18, the belt-like electrodes 101 are disposed in the cylindrical stationary member 200 so as to extend along the peripheral direction of the stationary member 200, and the substantially cylindrical moving member 102 is inserted into the cylindrical stationary member 200 in such a manner as to come into close contact with the inner surface side of the latter.

According to this construction, the cylindrical moving member 101 can to reciprocate in the axial direction of the cylinder by switching the voltage patterns to the belt-like electrodes 101.

Figure 19:
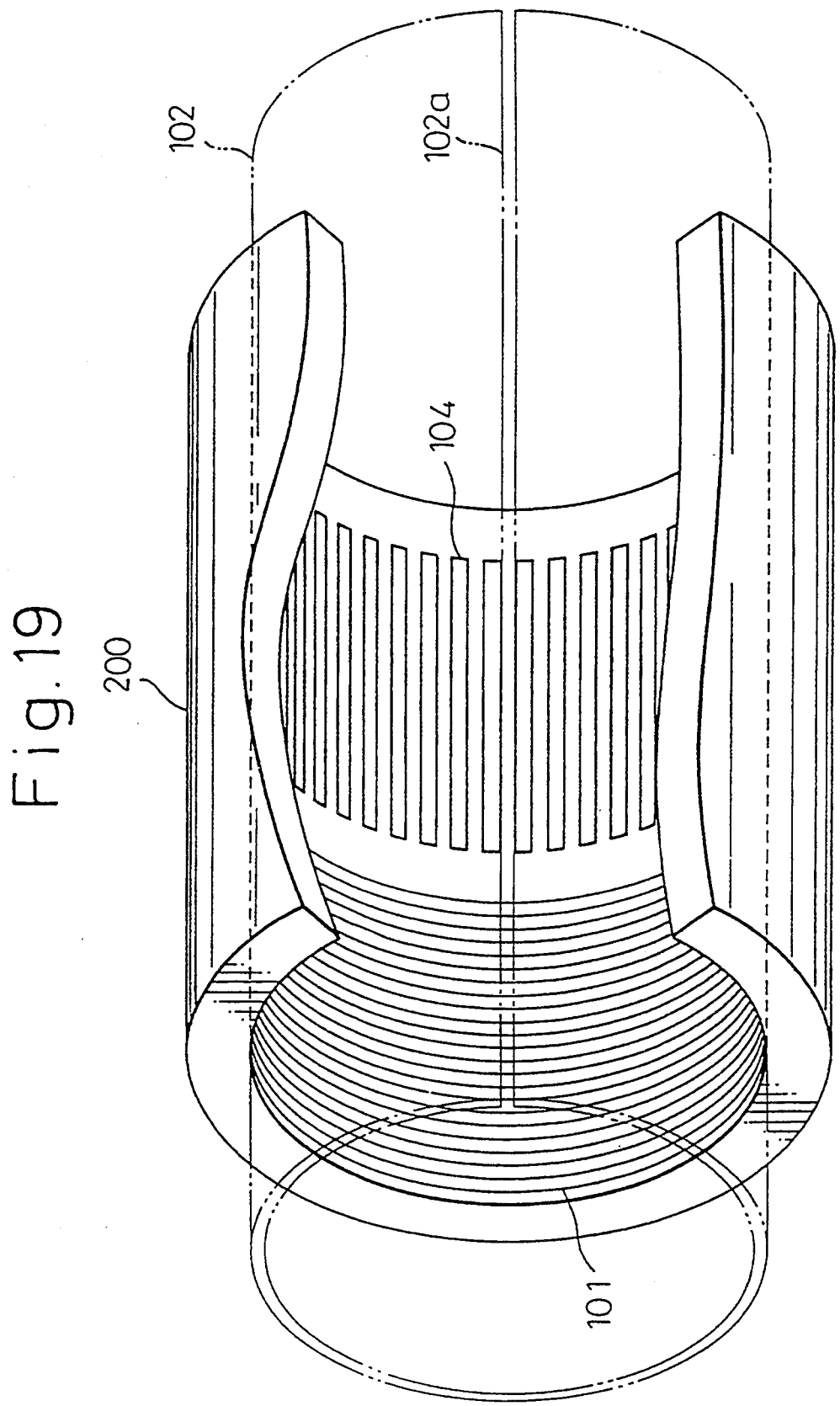
FIG. 19 is a structural explanatory view of still another structure of the cylindrical electrostatic actuator.

Furthermore, the cylindrical moving member 102 can be driven for rotation by additionally disposing the belt-like electrodes 104 to the cylindrical stationary member 200 in such a manner as to extend in the axial direction of the stationary member 200 as shown in FIG. 19.

Incidentally, the substantially cylindrical moving member 102 shown in each of FIGS. 18 and 19 is fitted to a rotatably shaft member, or the like, which is not shown in the drawings at its left end and/or its right end so that its force can be taken out. Moreover, a slit 102a is formed so as to extend in the axial direction of the cylinder, and the extension in the peripheral direction, when the moving member 102 receives the force of repulsion, is absorbed.

Figure 20:
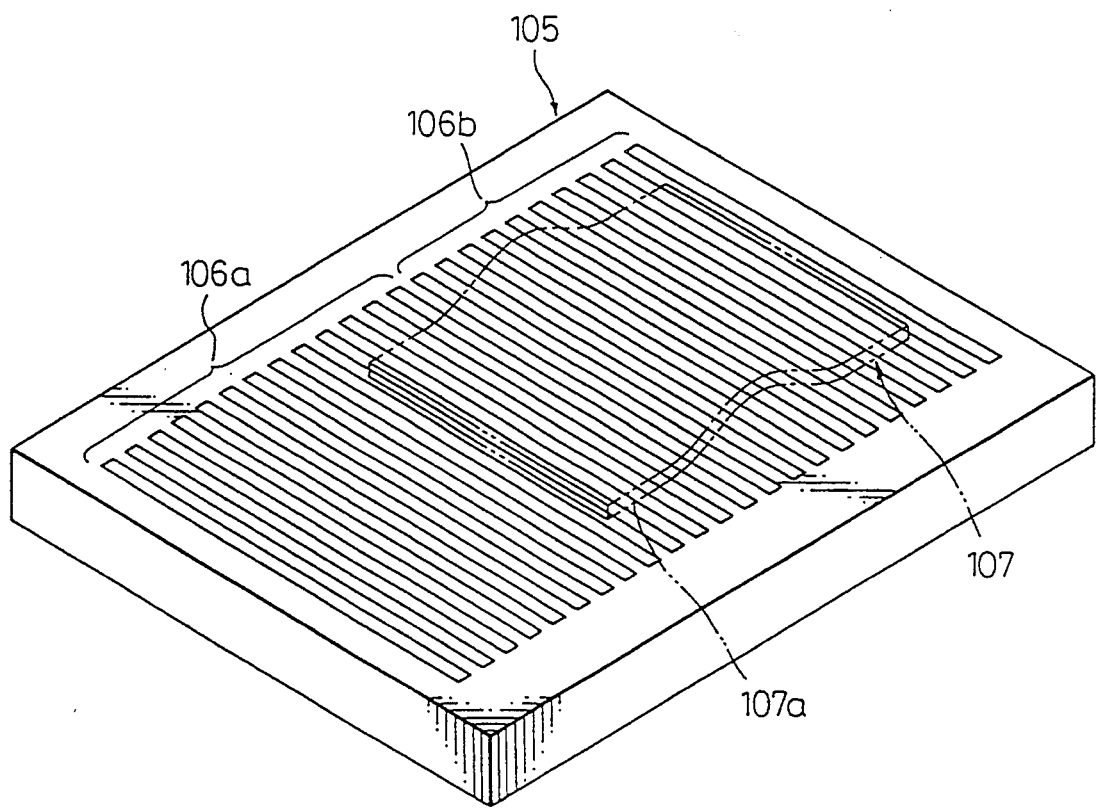
FIGS. 20, 21(a) to (d) and 22 are operation explanatory views of an electrostatic actuator which is constituted so that a second member moves in an inchworm-like motion.

Furthermore, the belt-like electrode groups 106a, 106b are disposed on the flat sheet-like stationary member 105 as shown in FIG. 20, and a voltage pattern switching device is disposed so that each electrode group 106a, 106b can be individually driven.

In this construction, the voltage patterns similar to those shown in FIG. 3 are first applied to the belt-like electrode groups 106a and 106b. Then, the voltage pattern such as shown in FIG. 3(m) is applied to only the belt-like electrode group 106b. Since the tip portion 107a of the sheet-like moving member 107 is at a halt under the attracted state to the belt-like electrode group 106a as shown in FIG. 21, its rear end portion 107b is moved to the left as shown in FIG. 3(n). Accordingly, its center portion 107c floats up.

Figure 3M:
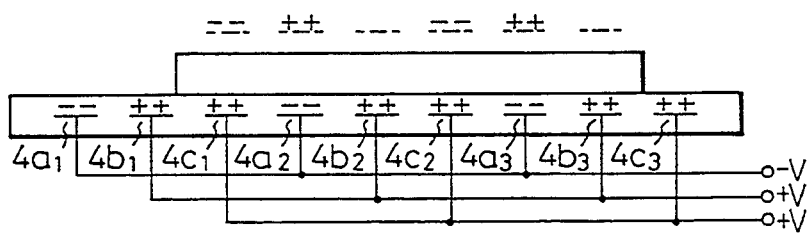
Figure 3N:
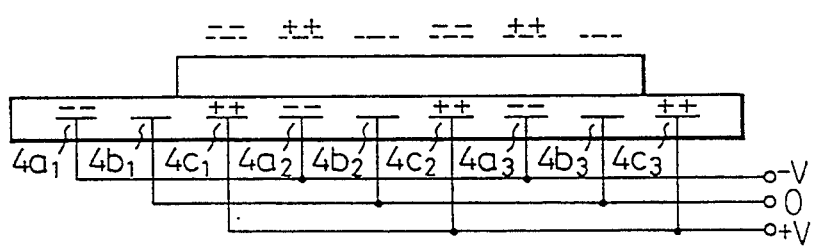
Figure 3O:
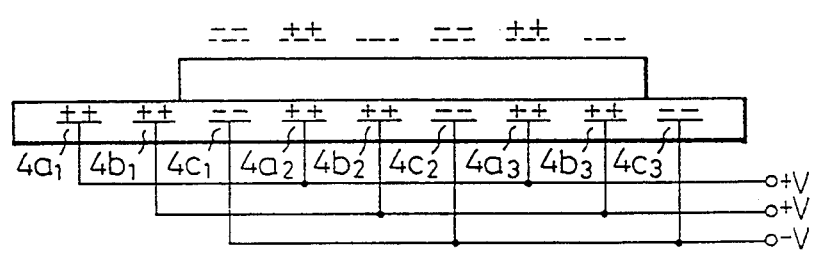
Figure 3P:
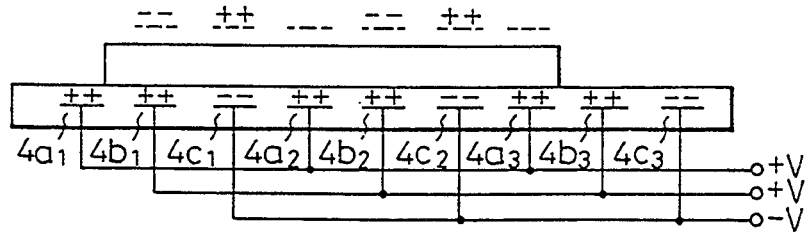
Figure 3Q:
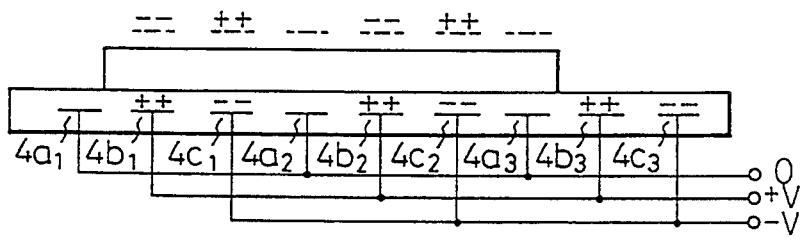
Figure 3R:
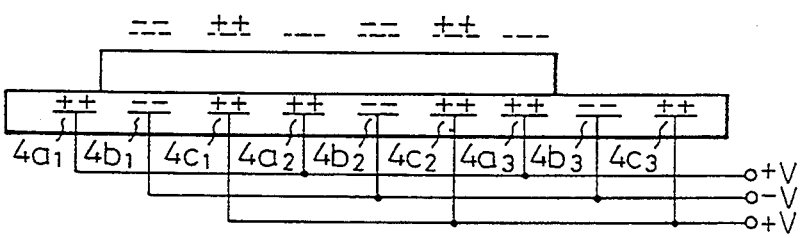
Figure 3S:
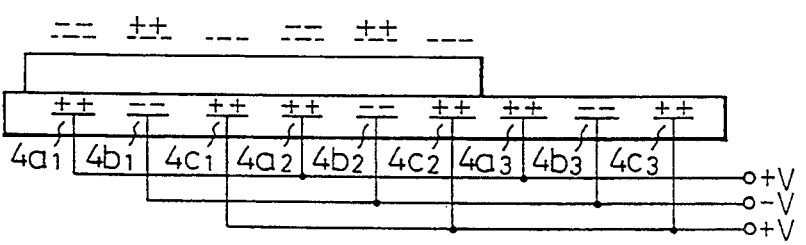
Figure 3T:
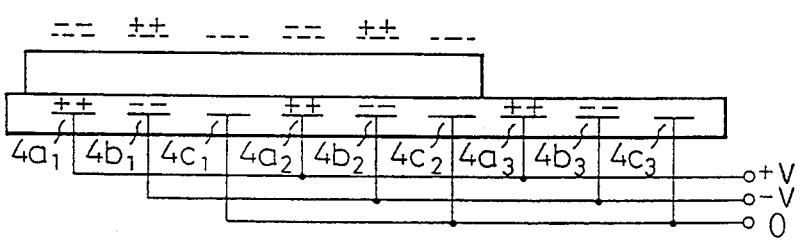
Figure 21A:
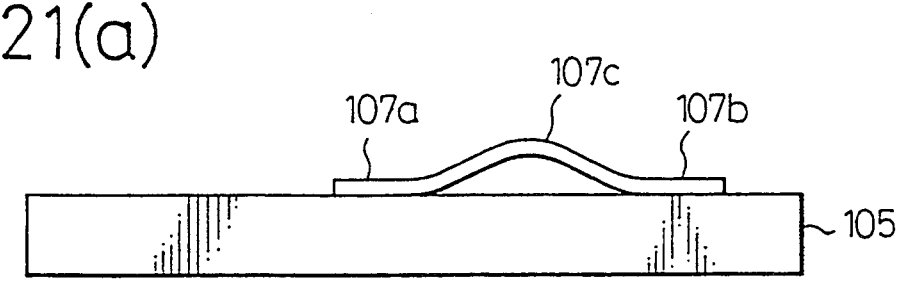
Figure 21B:
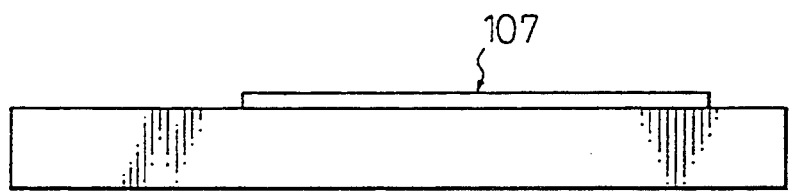

Next, the voltage pattern shown in FIG. 3(m) is applied only to the belt-like electrode group 106a in the same way as above. Then, since the rear end portion is under the attracted state onto the stationary member 105, its tip portion 107a is moved to the left. Accordingly, the sheet-like moving member 107 is stretched as shown in FIG. 21(b) and comes into contact with the stationary member 105 throughout its entire surface.

Figure 21C:
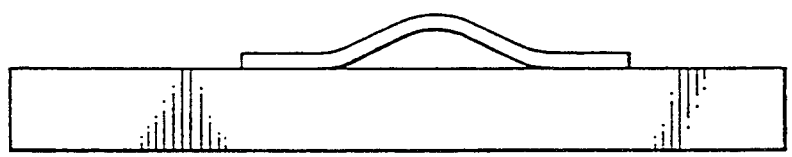
Figure 21D:
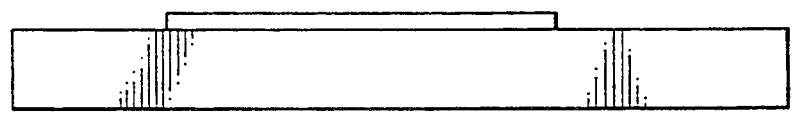

When the operations described above are repeated, the sheet-like moving member 107 moves in a way similar to that of an inchworm as shown in FIGS. 21(c) and (d).

Figure 22:
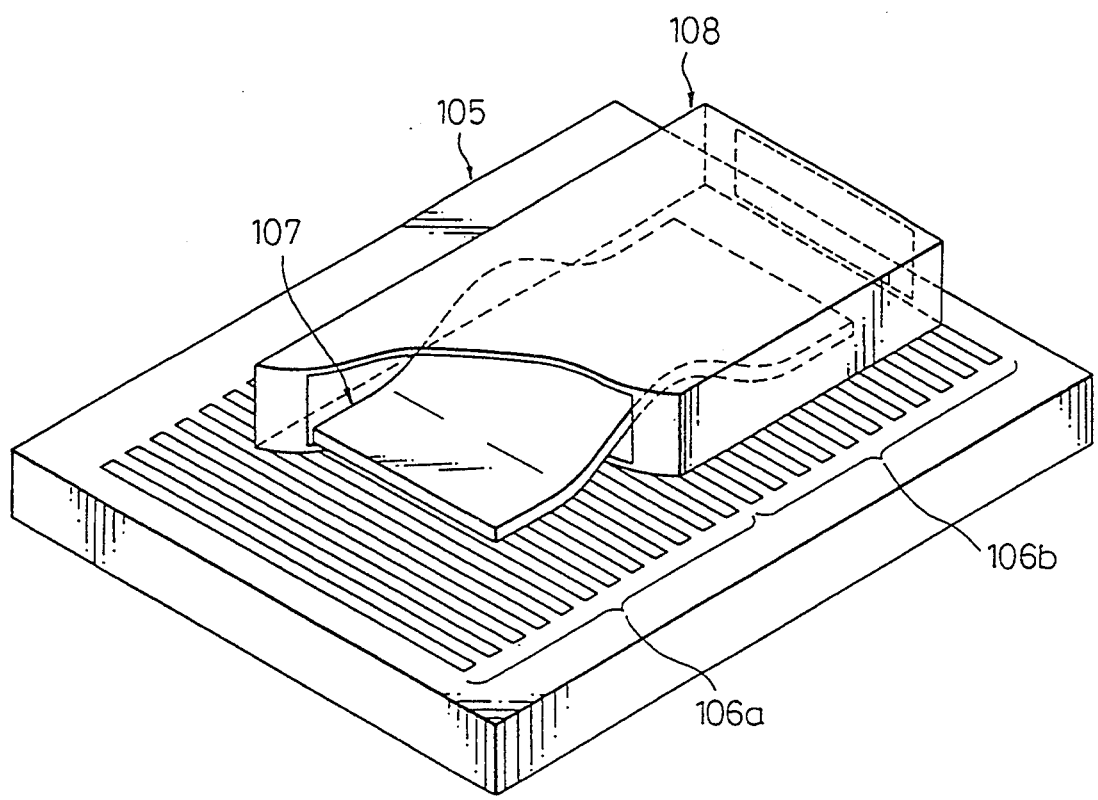

The sheet-like moving member 107 does not need electric wirings, and the like. Therefore, when the sheet-like moving member 107 is disposed inside a hollow piping 108 and the stationary member 105 is disposed outside this hollow piping 108 as shown in FIG. 22, for example, the sheet-like moving member 107 can be moved freely inside the hollow piping 108. In this case, if blades are fitted to the sheet-like moving member 107, cleaning of the piping can be carried out. If a push plate is fitted, transfer, extrusion, and the like, of articles can be made inside the piping.

Figure 23:
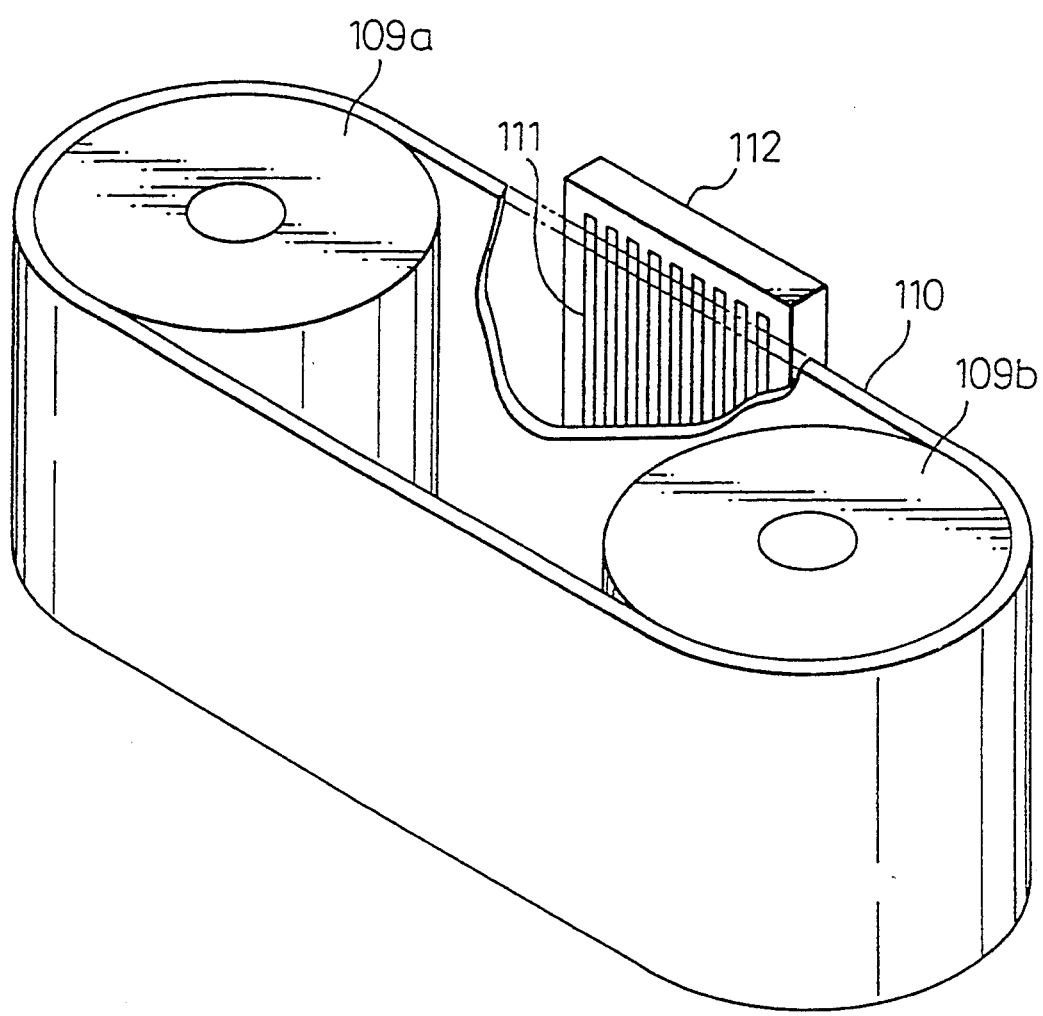
FIGS. 23 to 26 are explanatory views of an electrostatic actuator using an endless belt-like moving element.

FIG. 23 shows an embodiment wherein the moving member is constituted in an endless belt form.

As shown in the drawing, the moving member 110 made of a high resistance body in the endless belt form is wound between and inside rotary rollers 109a and 109b.

The stationary member 112 having the belt-like electrode groups 111 disposed thereon is interposed between the rollers 109a and 109b.

According to this construction, an article or articles placed on the endless belt-like moving member 110 can be transported.

Sheets of paper placed on the surface of the endless belt, too, can be transported by the force of friction between the endless belt and the article and/or by the force of attraction of the electrostatic charge generated on the surface of the endless belt.

Furthermore, when two sets of mechanisms shown in FIG. 23 are disposed in such a manner that the endless belt-like moving members 110 can come close to, or come into contact with, each other, sheet-like articles such as sheets of cut paper can be clamped and transported between them.

Figure 24:
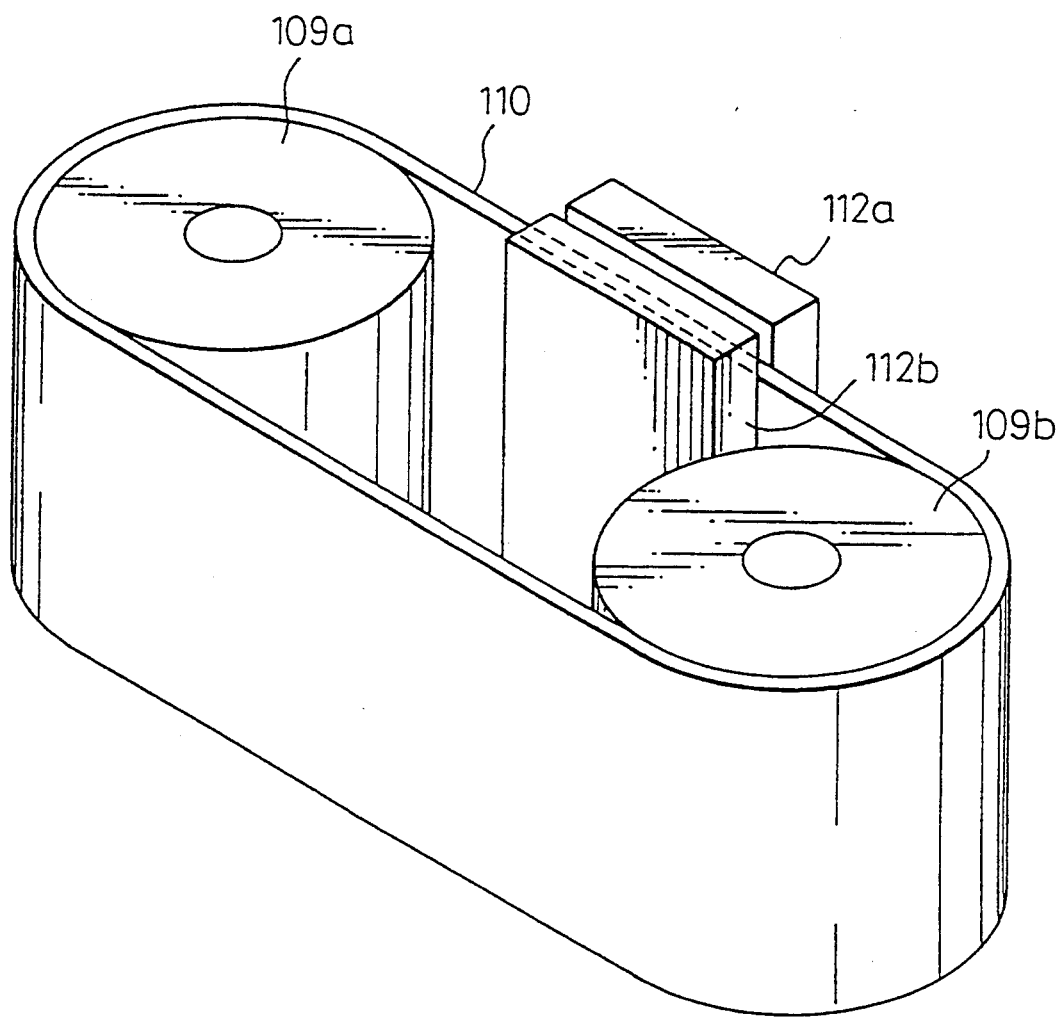

Two stationary members 112a, 112b having the belt-like electrode groups 111 may be disposed on both sides of the endless belt-like moving member 110 which is constituted by interposing the high resistance body layer between the insulating films, as shown in FIG. 24.

Figure 25:
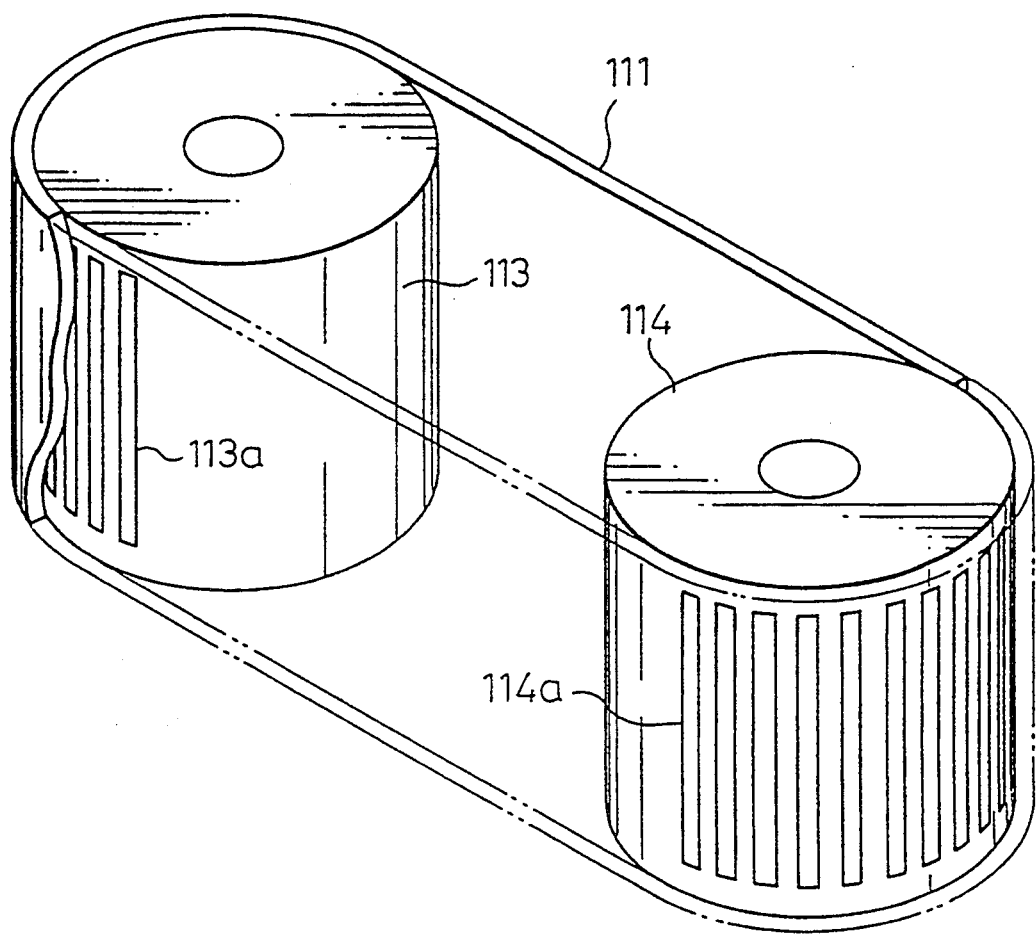
Figure 26:
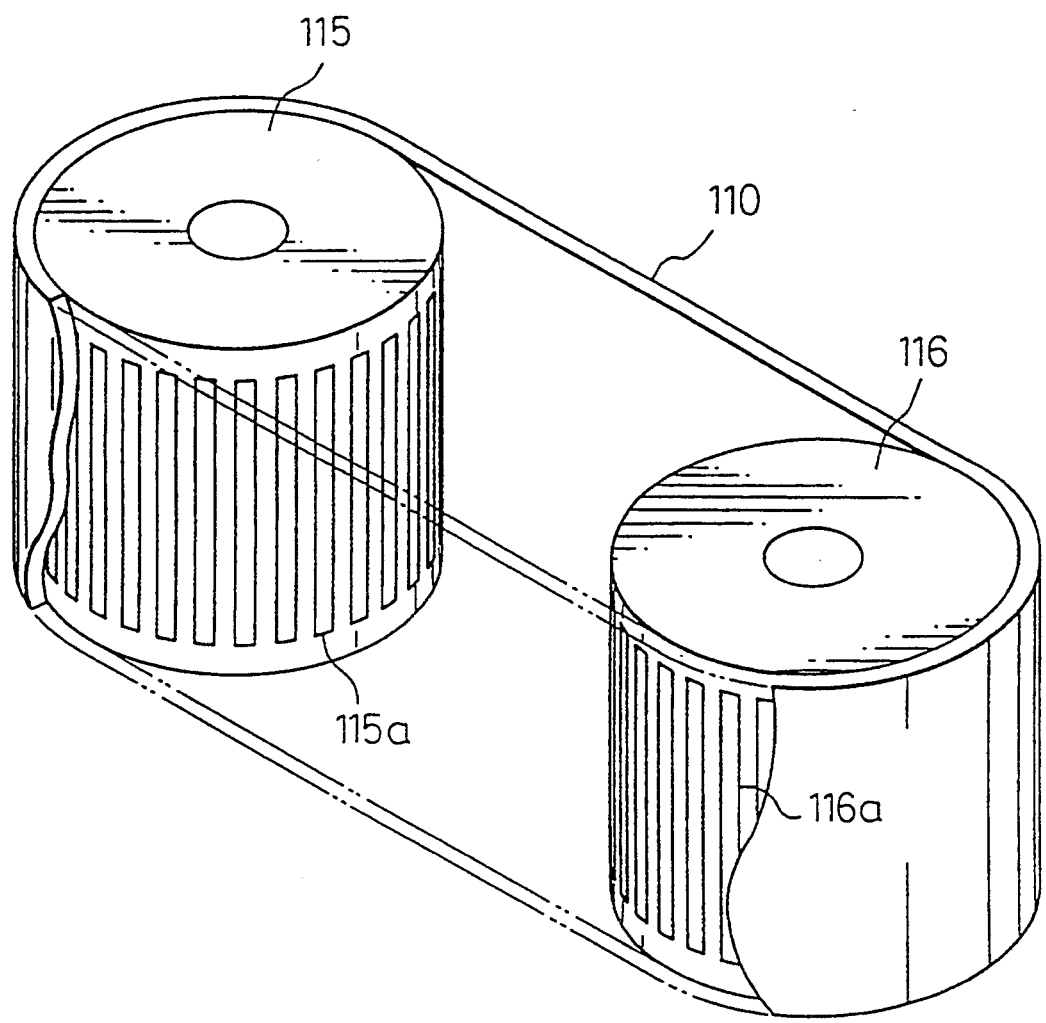

As shown in FIG. 25, further, the endless belt-like moving member 111 can be driven for rotation by burying the belt-like electrode groups 113a, 114a into the cylindrical members 113, 114 made of an insulating material and disposed fixedly, respectively.

Still alternatively, when the belt-like electrode groups 115a, 116a are buried into a roller 115 and a follower roller 116, that are driven for rotation by a driving source (motor), not shown in the drawing, and are made of an insulating material, a feed operation by driving which is not shown and a fine feed operation by the belt-like electrode groups can be carried out.

Next, as another embodiment of the present invention, an embodiment using a structure wherein a spherical portion is formed at part of each of the first and second members will be hereinafter illustrated.

Figure 27:
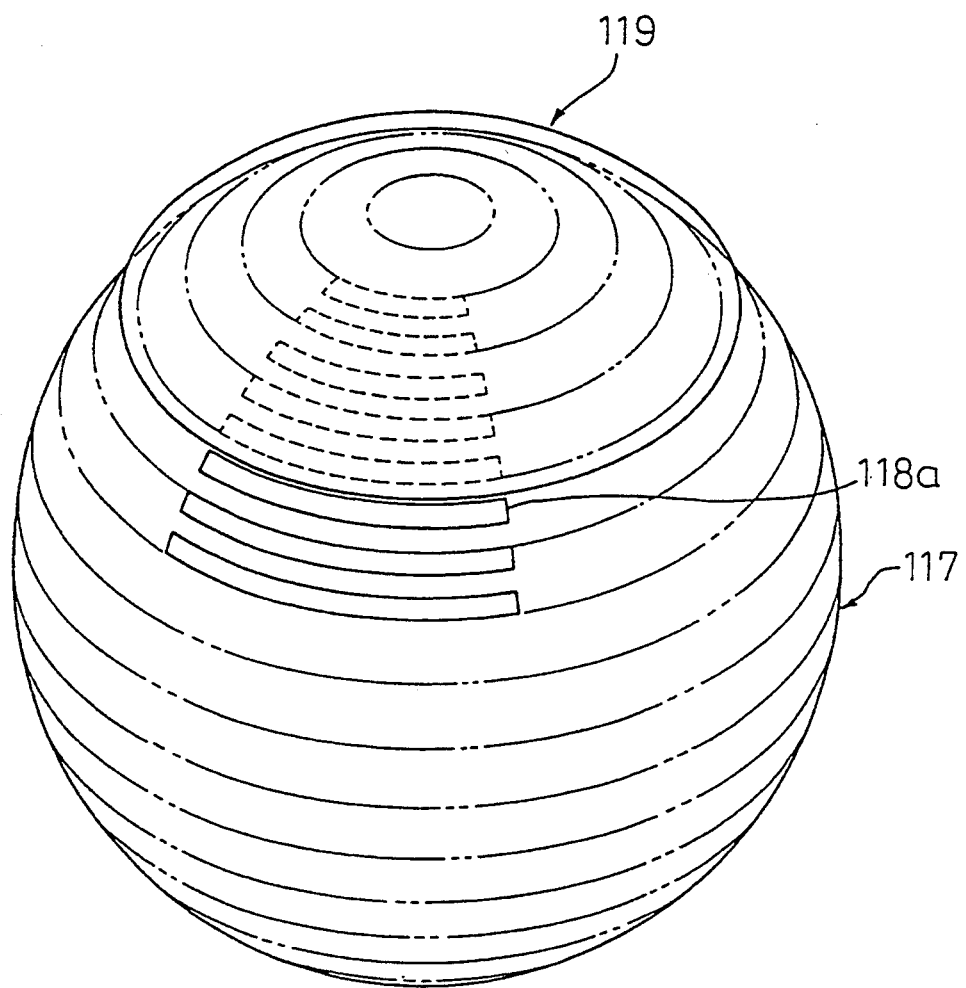
FIGS. 27, 28(a) to (c), 29, 30 and 31 are explanatory views of a spherical electrostatic actuator.

FIG. 27 shows an embodiment wherein the stationary member is spherical, and FIG. 28 is its sectional view. A plurality of belt-like electrode groups 118a–118b having the belt-like electrodes disposed in the proximity of the surface of the spherical stationary member 117 in a latitudinal direction, that is, concentrically with one another with the apex of the sphere being the center, are disposed. These belt-like electrode groups 118a–118d are disposed in such a manner that their longitudes are deviated by every 90° (though only the belt-like electrode group 118a is shown in FIG. 27), so that the voltage patterns can be individually applied to them.

The hemi-spherical moving member 119 consisting of the insulating material and the high resistance body layer laminated on the insulating material is put onto this spherical stationary member 117.

Figure 28A:
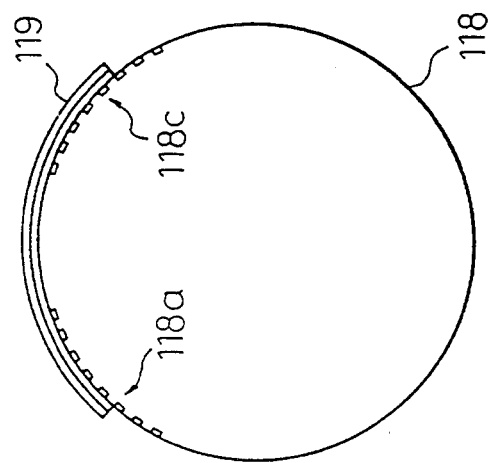
Figure 28B:
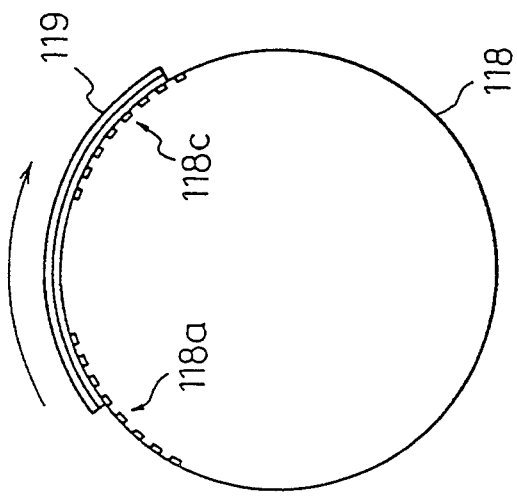
Figure 28C:
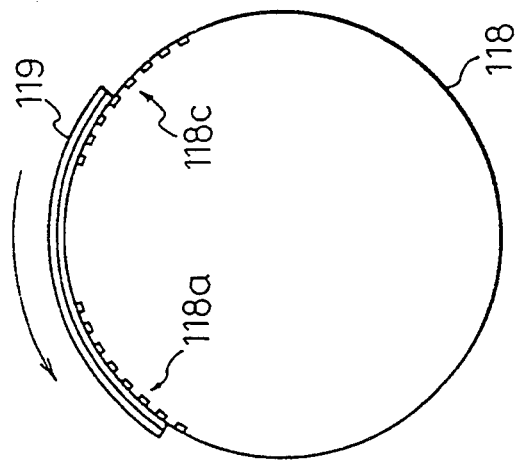

Then, as shown in FIG. 28, a pair of belt-like electrode groups 118a and 118c or a pair of belt-like electrodes 118b and 118d are driven in the same way as the belt-like electrode groups 42, 43 shown in FIG. 10. In this way, it is possible to move the moving member 119 under the state shown in FIG. 28(a) to the right as shown in FIG. 28(b), and to move it to the left as shown in FIG. 28(c).

Figure 29:
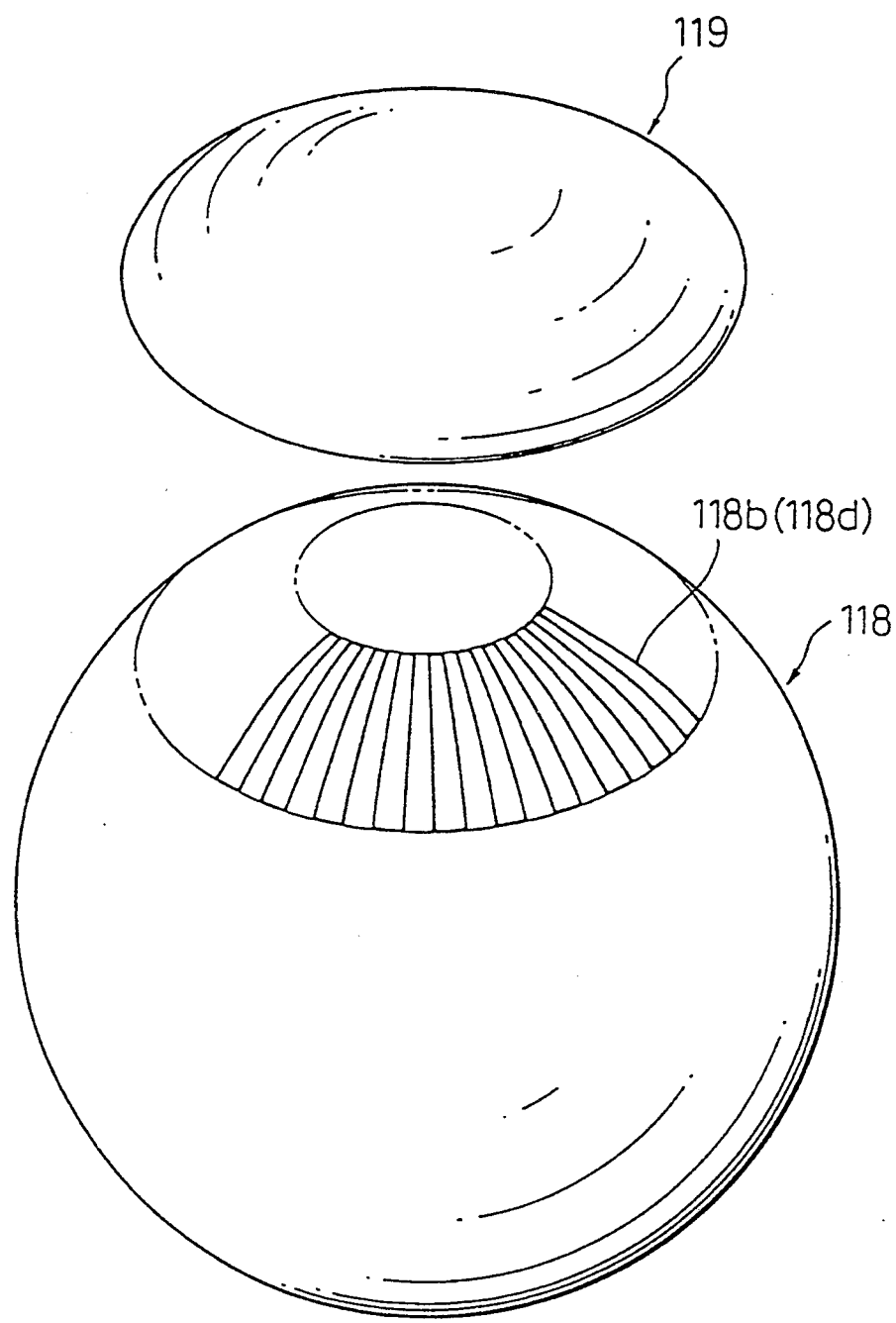

The function of rotating the hemi-spherical moving member 119 can be added by disposing a pair of belt-like electrode groups 118b and 118d in such a manner as to extend in the latitudinal direction or in other words, in the radial direction from the apex, as shown in FIG. 29.

Figure 30:
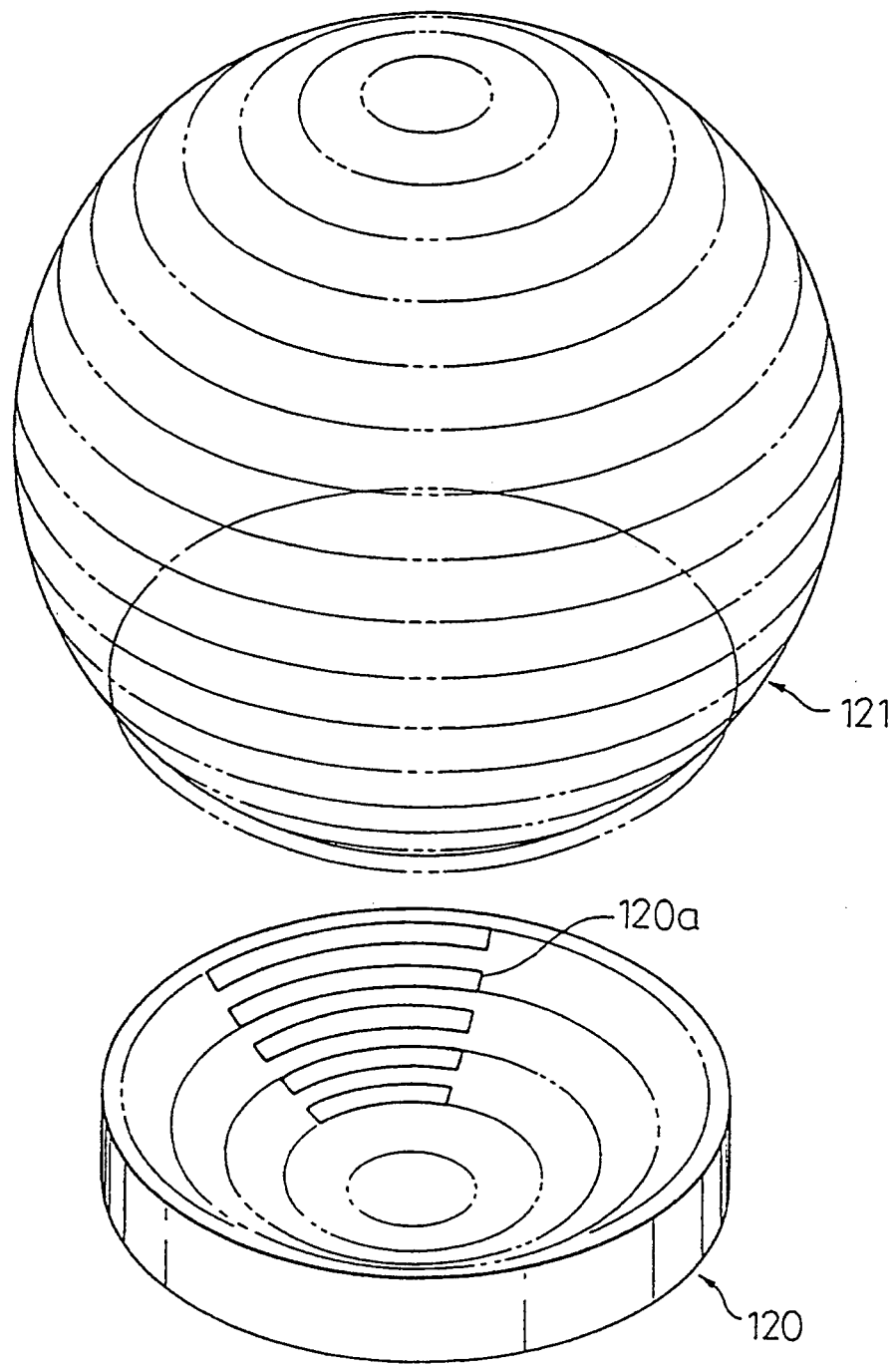

Furthermore, the stationary member may be a conical hemi-spherical stationary member 120 as shown in FIG. 30.

A plurality of belt-like electrode groups 120a–120d having belt-like electrodes buried so as to extend in the latitudinal direction are buried in the proximity of the surface of the recess portion of the conical stationary member 120 in the same way as in FIG. 27. The spherical moving member 121 is placed on this conical stationary member 120. Preferably, this spherical moving member 121 is a hollow ball consisting of a high resistance body.

Figure 31:
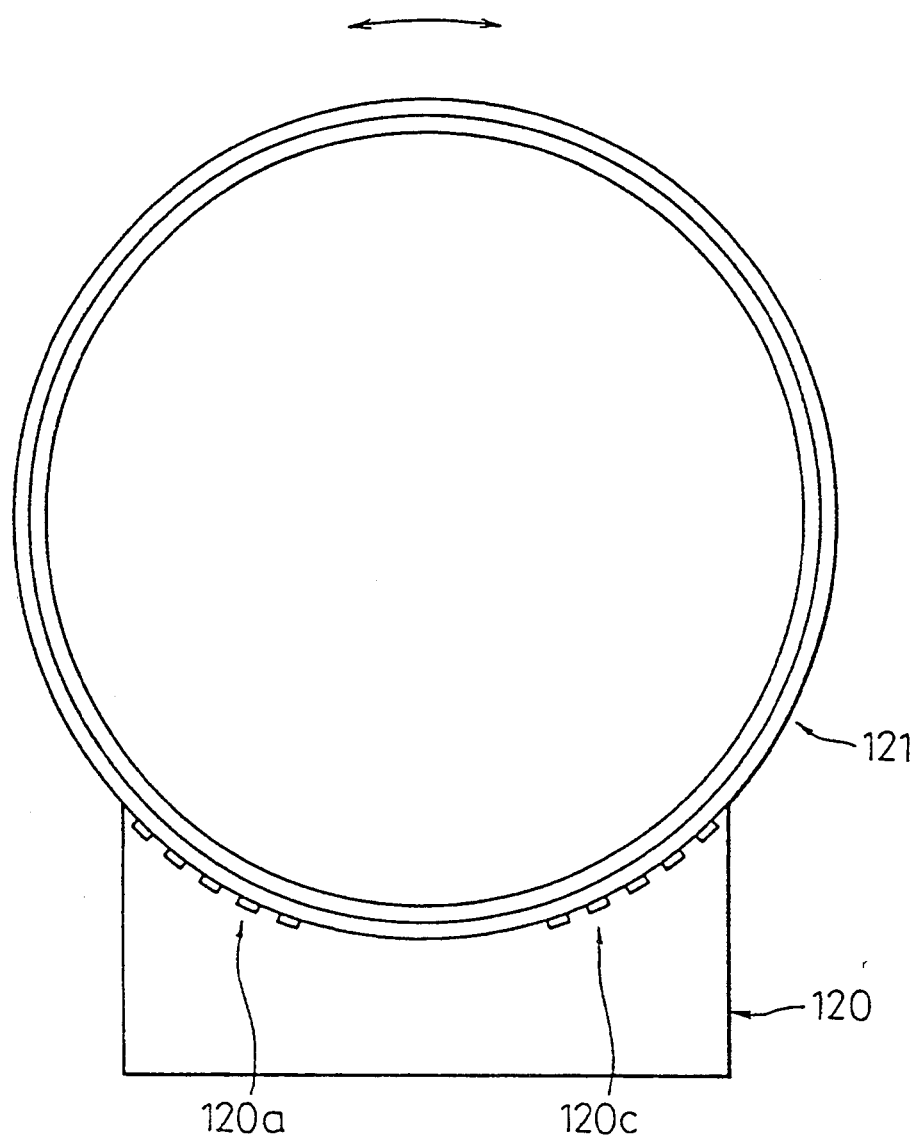

As shown in the sectional view of FIG. 31, each of the belt-like electrode groups 120a–120d is driven in the same way as in FIG. 28 and in this way, the spherical moving member 121 can be rotated and moved on the conical stationary member 120.

Accordingly, when a map pattern of the earth, for example, is formed on the surface of the spherical moving member 121, an arbitrary position on the map can be located at the position at which it can be seen most easily, without any limitation such as a support arm of a conventional world globe.

When only a pair of belt-like electrode groups 120b and 120d are shaped as the electrode groups that extend in the latitudinal direction of FIG. 29, the function of rotating the spherical moving member 121 can be added, as well.

Figure 32A:
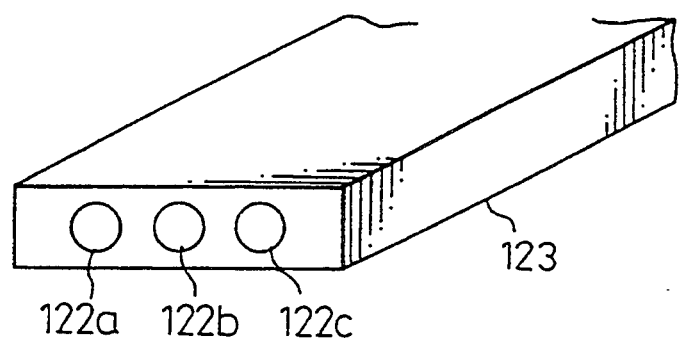
FIGS. 32(a) and 32(b) are wiring explanatory views of belt-like electrodes.
Figure 32B:
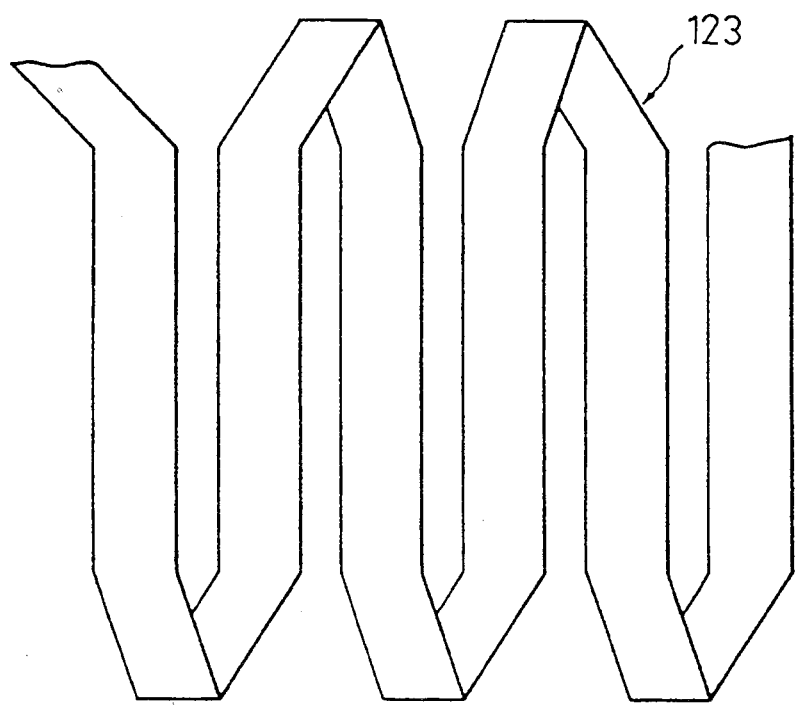

Incidentally, the belt-like electrode groups shown in FIGS. 27 and 30 that are disposed in the stationary member may be produced by burying and wiring independently three power supply lines 122a–122b in a flat sheet-like cable made of an insulating material, as shown in FIG. 32(a), then folding this cable as shown in FIG. 32(b), and bonding the folded cable onto the spherical surface or recessed surface of the spherical or conical stationary member.

In this case, since the power supply lines are round wires, the withstand voltage can be improved and a treatment for jump-over of three-phase wires becomes unnecessary.

As has already been explained with reference to FIG. 3, the force for moving the moving member can be generated by effecting at least three-phase wiring for the belt-like electrodes disposed on the stationary member. The connection lines for interconnecting the belt-like electrode groups of each phase and connecting them to the driving control circuit can be disposed without crossing over with one another by wiring them mutually in the comb shape up to two phases on a single surface.

When the lines are wired in all of the three phases on a single surface, however, the lines of the different phases cross over with one another, so that insulation must be secured at the crossover points.

When the belt-like electrodes are formed in a miniature pattern by utilizing the thin film formation technique, defects are likely to occur in the insulating film and inferior insulation is likely to occur because the insulation distance at the crossover portions is small and steps exist due to the difference of the film thickness. However, when a thick insulating film is formed, on the contrary, in order to secure sufficient insulation, a longer film formation time is necessary and its through-hole formation step becomes much more troublesome.

Figure 33:
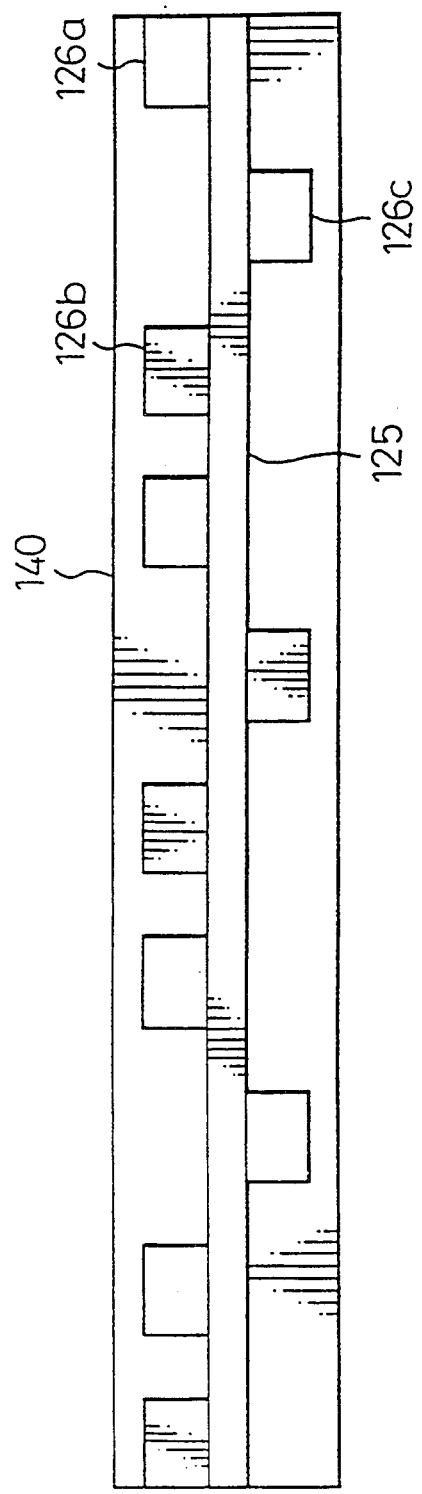
FIG. 33 is an explanatory view showing another wiring method of the belt-like electrodes.

In order to solve these problems, the belt-like electrodes 126a of the first phase and the belt-like electrodes 126b of the second phase are disposed on one of the surfaces of the insulating material 125 while the belt-like electrodes 126c of the third phase are formed on the other surface, as shown in FIG. 33.

When the voltages of $+V$, 0 and $-V$ are sequentially switched and applied to these belt-like electrodes 126a–126c of the first, second and third phases, the moving member disposed on the stationary member 140 so as to face the latter can be moved.

Incidentally, the belt-like electrodes 126c of the third phase has a greater distance to the moving member than the belt-like electrodes of the other phases by the thickness of the insulating material 125. Accordingly, the quantity of the charges that can be induced on the surface of the moving member is small and the generated force is small.

However, this difference of the moving force can be limited to the range in which no problem occurs, by setting the voltage to be applied to the belt-like electrodes 126c of the third phase to a voltage higher than the voltages to be applied to the belt-like electrodes 126a and 126b of the first and second phases.

The treatment for jump-over of the lines of the three-phases is carried out by bonding the first and second power supply lines (e.g. the $+V$ power supply line and the 0 V power supply line) 126a, 126b to the upper surface of the flexible sheet-like insulating material 125 and the third power supply line (e.g. the $-V$ power supply line) 126c to the lower surface as shown in FIG. 34(a), and pressing these lines from both sides as shown in FIG. 34(b), whereby each of the power supply lines 126a–126c, particularly the $+V$ power supply line 126a and the $-V$ power supply line 126c, can be separated by the deformed insulating material 125 as shown in FIG. 34(c). Incidentally, it is advisable to soften the insulating material 125 by heat-treatment, or the like, before the press force is applied.

The structure on the stationary member side for moving the moving member is not particularly limited to the belt-like electrodes of three-phase wiring shown in FIG. 3.

According to the construction described above, the distance between the belt-like electrodes of the first to third phases and the moving member can be made constant.

Furthermore, the moving member mounted onto the stationary member can be moved by uniformly forming the electrodes of the third phase on the other surface of the insulating material 140 as shown in FIG. 35 and then switching and applying sequentially the voltage patterns to be applied to the first to third phases in the manner described above.

As shown in FIG. 36, the electrodes 126c that are uniformly formed on the entire surface of the other surface of the insulating material 140 are grounded.

The moving member 150 can be moved by sequentially switching and applying the voltages to be applied to the electrode groups 126a of the first phase and to the electrode groups 126b of the second phase to $+V$, 0 and $-V$.

Figure 36A:
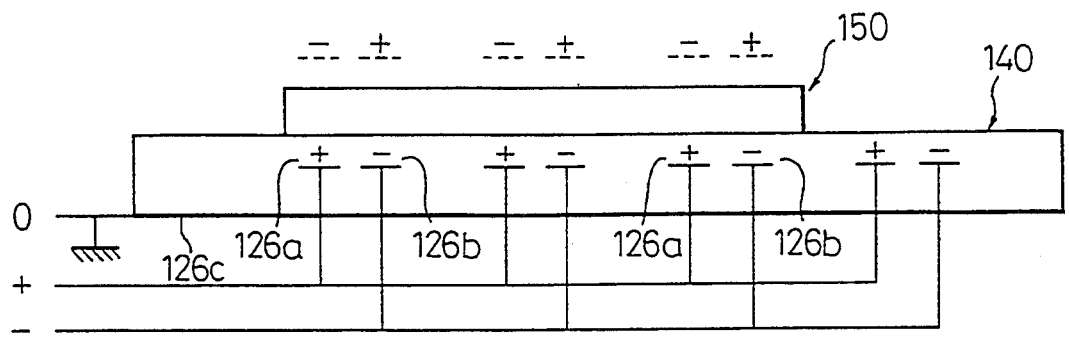
FIGS. 36(a) to 36(c) are explanatory views of another structure of a first member of an electrostatic actuator.

In other words, as shown in FIG. 36(a), the $+V$ voltage is first applied to the electrode group 126a of the first phase and the $-V$ voltage is applied to the electrode group 126b of the second phase. Accordingly, as has already been explained with reference to FIG. 3, the charge is induced at the position which oppose the electrodes 126a, 126b on the moving member 150 made of the high resistance body.

Figure 36B:
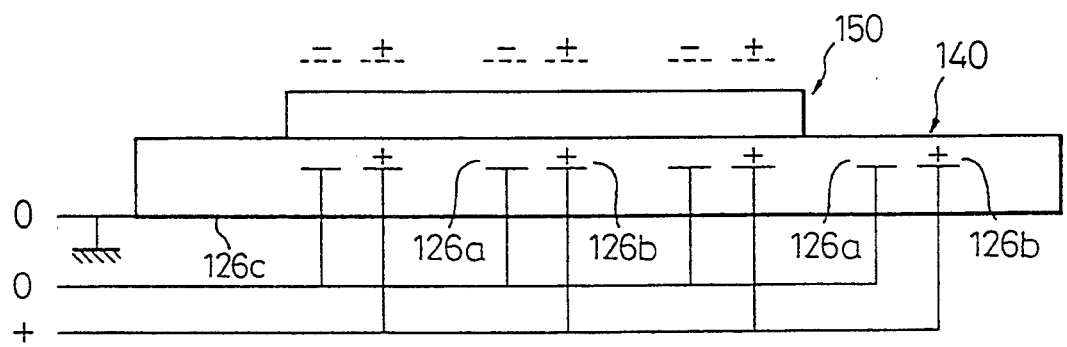

Next, as shown in FIG. 36(b), the 0 V voltage is applied to the electrode group 126a of the first phase and the −V voltage is applied to the electrode group of the second phase.

Then, the charge of the electrode group 126a of the first phase disappears, and the positive charge is immediately induced to the electrode group 126b of the second phase. However, the charge that is induced on the moving member 150 cannot immediately move because the moving member 150 is made of the high resistance body.

Accordingly, the force of repulsion acts between the positive charge of the electrode group 126b of the second phase and the positive charge on the moving member 150, and the moving member 150 receives the force in the floating direction and floats up from the stationary member 140, or the friction between the stationary member 140 and the moving member 150 can be drastically reduced.

Figure 36C:
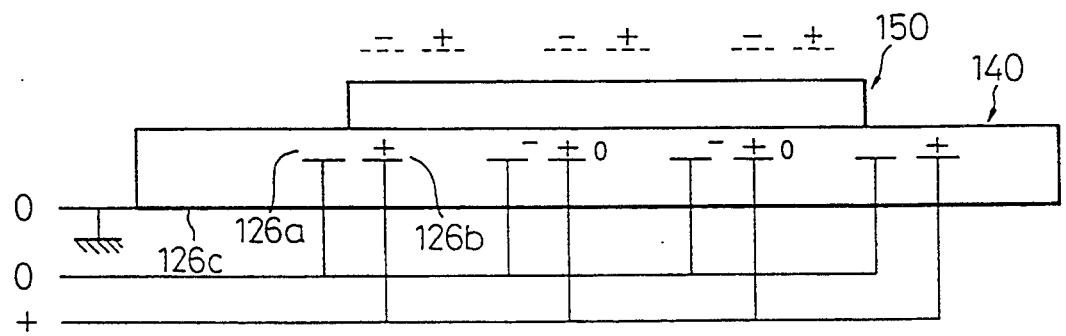

On the other hand, since the force of attraction between the negative charge induced on the moving member 150 by the electrode group 126a of the first phase and the positive charge of the electrode group 126b of the second phase acts, the moving member 150 can be moved to the right in FIG. 36(c).

Furthermore, in order to move the moving member 150 to the right in the drawing, the −V voltage is applied to the electrode group 126a of the first phase and the 0 V voltage is applied to the electrode group 126b of the second phase.

Accordingly, the force of attraction acts between the positive charge induced on the moving member 150 and the negative charge induced to the electrode group 126a of the first phase, and hence, the moving member 150 moves to the right in the drawing.

When the voltages are applied as shown in FIG. 36(a), the moving member 150 moves by a distance corresponding to one phase pitch of the electrode groups and attains the same state as that of FIG. 36(a).

Accordingly, when the operations described above are repeated, the moving member can be sequentially moved to the right.

In order to move the moving member to the left in the drawing, on the other hand, it is possible to apply the reverse voltages to the voltages described above to the electrode groups 126a, 126b of the first and second phases.

In other words, the moving member 150 can be moved to the left in the drawing by applying the negative voltage to the electrode group 126a of the first phase and the 0 V voltage to the electrode group 126b of the second phase under the state shown in FIG. 36(a).

Figure 37:
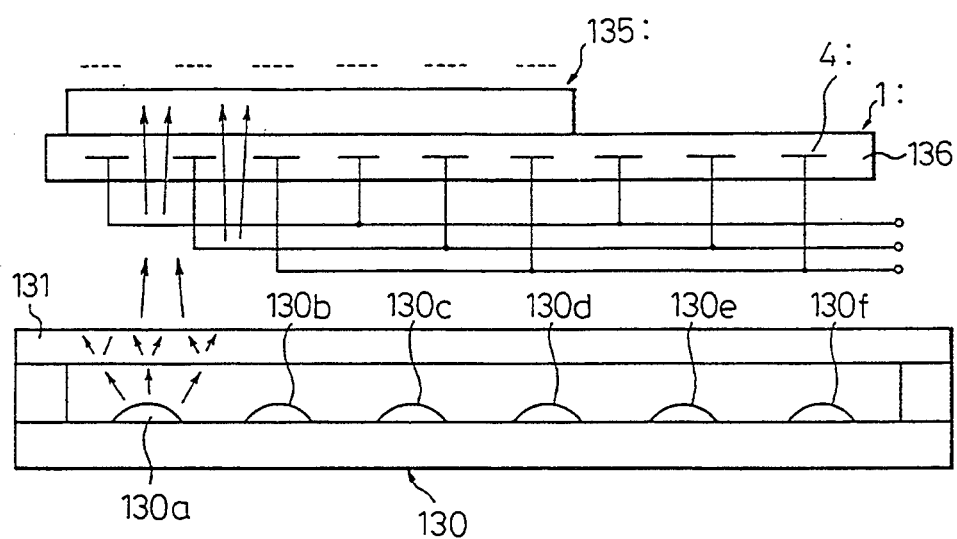
FIG. 37 is an explanatory view of an electrostatic actuator utilizing light.

FIG. 37 is an explanatory view of the electrostatic actuator that utilizes light.

In this drawing, the differences from FIG. 3 are that the moving member is a moving member 135 made of a resistance body having photoconductivity, the insulating material is a transparent or translucent insulating material 136 and a light source 130 is disposed below the insulating material 136.

This light source 130 comprises a plurality of discrete light emission devices 130a–130f such as LED device, discharge fluorescent lamps, or the like, and a diffuser plate 131 interposed between the discrete light emission devices 130a–130f and the insulating material 136.

The operation of this electrostatic actuator will be explained.

To begin with, the light source 130 is driven so that the rays of light emitted from the light source 130 irradiate the full surface of the photoconductive moving member 135 through the diffuser plate 131.

Accordingly, the electric resistance of the photoconductive moving member 135 is drastically reduced by the irradiation of light and the charge is easily movable under this state.

When the voltages such as shown in FIG. 3(a) are applied to the belt-like electrodes 4 under this state, the charge having the opposite polarity to that of the opposed belt-like electrode 4 concentrates quickly on the moving member 135 at the position opposite to each belt-like electrode 4.

Next, driving of the light source 130 is stopped and the irradiation of light to the photoconductive moving member 135 is also stopped so as to make the surroundings dark. Accordingly, the photoconductive moving member 135 becomes an extremely excellent resistance body.

When the voltage patterns applied to the belt-like electrodes 4 are switched under this state as shown in FIG. 3(b), the charge of the belt-like electrode can immediately change, but the charge on the moving member 135 cannot immediately change.

Therefore, the moving member 135 can be moved to the right as shown in FIGS. 3(c) and 3(d).

In order to move the moving member 135 further to the right, the voltage patterns shown in FIG. 3(e) are applied under the state where the irradiation of light is made, and thereafter the same operation as described above is repeated. This procedure also holds true of the case where the moving member 135 is moved to the left.

Besides the afore-mentioned local light emitter, a surface light emission device can also be used as the light source.

The highest efficiency can be obtained by disposing the light source above the moving member.

However, even when the light source is disposed below the light source as shown in FIG. 37 and any shade portions for the belt-like electrodes develop, it is only the portions where the charge moves that need photoconductivity. Accordingly, this arrangement can be sufficiently applied to practical use. In FIG. 37, both the belt-like electrodes and the light source can be disposed on the stationary member side. Accordingly, the feed of power can be carried out on the stationary member side.

Figure 38:
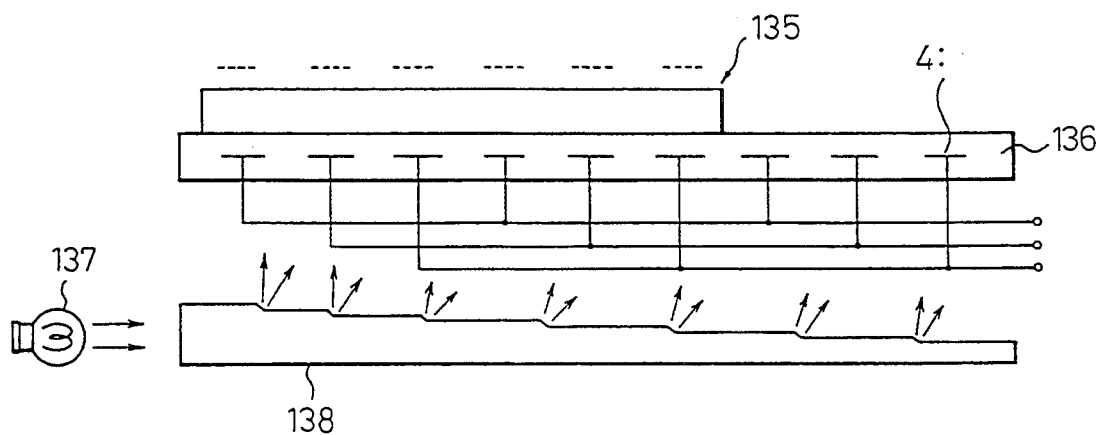
FIG. 38 is an explanatory view of another structure of the electrostatic actuator utilizing light.

The irradiation of light can be made to the moving member 135 from its side surface side by utilizing diffraction of light or by using a member 138 for sequentially diffusing the rays of light from the light source 137 disposed at the end surface of the member 138 depending on its shape, to a direction perpendicular to the surface, as shown in FIG. 38.

Such a light irradiation method can be applied, too, to the laminate type electrostatic actuators shown in FIGS. 5 to 7, etc.

In the electrostatic actuators described above, the length of the moving member must be at least a length that bridges between a plurality of belt-like electrodes.

Speaking conversely, the minimum length of the moving member that can be used is determined in accordance with the gap pitch of the belt-like electrodes.

Figure 39:
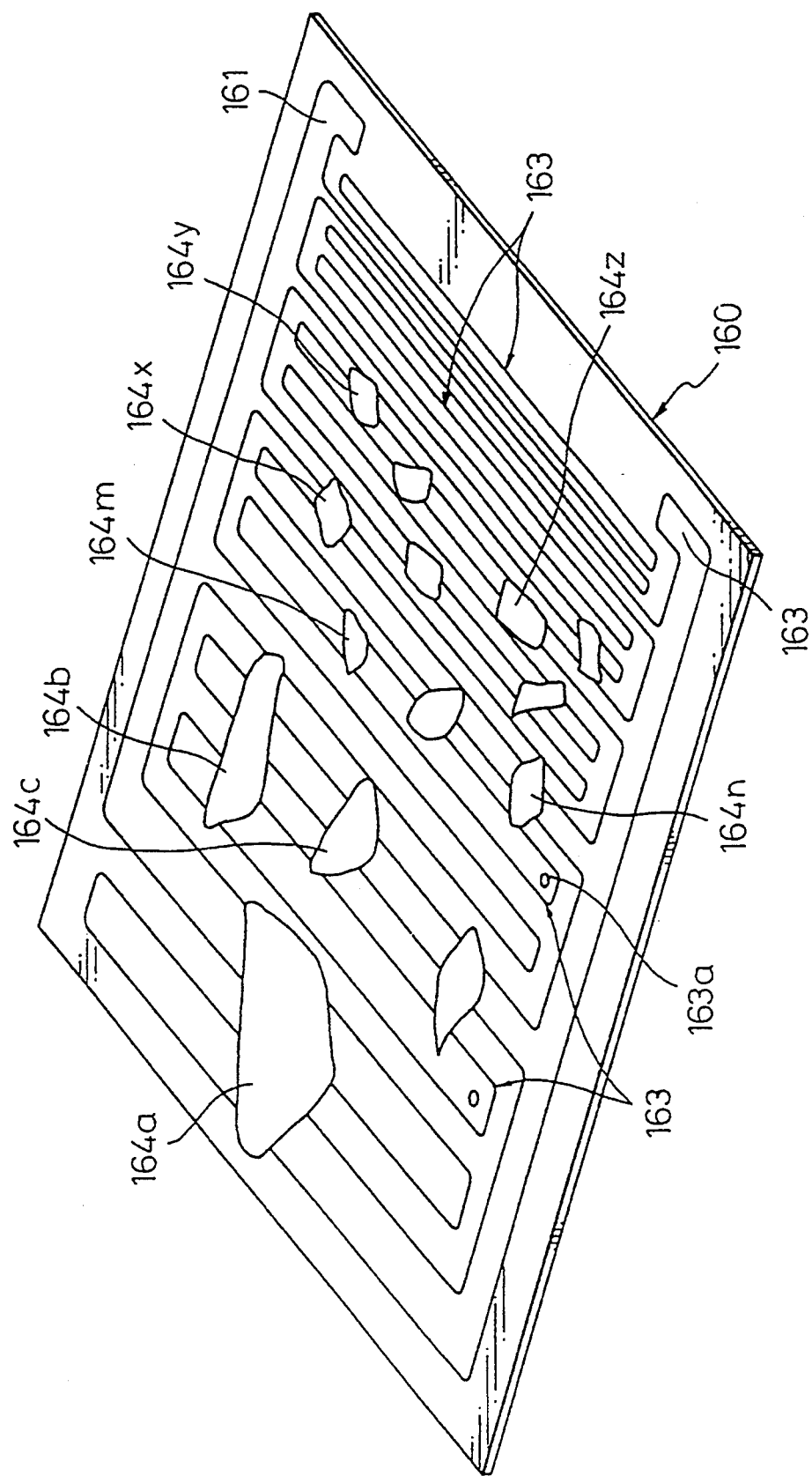
FIG. 39 is an explanatory view of a structure of an electrostatic actuator having a discrimination function by the application of the principle of the present invention.

Accordingly, if the arrangement in which the gap pitch of the belt-like electrodes progressively increases from a smaller pitch to a greater pitch as shown in FIG. 39, the moving member cannot move any more at the point of the gap pitch corresponding to its size.

In other words, a comb-like electrode 161 to which the voltage of the first phase is applied and a comb-like electrode 163 to which the voltage of the third phase is applied are mounted onto the insulating substrate 160.

The belt-like electrode groups 162 are mounted between the comb-like electrodes 161 and 163. The belt-like electrode groups 162 are connected on the back side through through-holes 163a formed at one of the ends of the electrodes so that the voltage of the second phase can be applied thereto.

As can be seen clearly from FIG. 39, the gap pitch between the electrodes becomes progressively greater to the left upward direction in the drawing. The electrodes are disposed while being insulated from one another.

In the construction shown in FIG. 39, the voltage pattern to be applied to each electrode is switched in the same way as in FIG. 3.

Then, big and small moving members 164a, 164b, 164c, . . . placed on the portions of the insulating substrate 160 constituting the stationary member, where the electrode pitch is dense, are moved to the left in the drawing due to the action between the charge patterns induced to the surface and the charge of the belt-like electrodes.

In this electrostatic actuator, the charge patterns of at least three phases must be formed on the moving member. Therefore, the moving members 164x, 164y, 164z, . . . having small sizes remain and stay at the right end side of the insulating substrate 160, and the moving members 164a, 164b, . . . move to the left end side of the insulating substrate 160.

Accordingly, the sizes of the moving members can be classified.

The moving members are paper moving members and plastic moving members and they can be classified in accordance with their sizes. Moreover, since the moving distance varies in accordance with the electric resistance of the moving members, they can also be classified in accordance with electric resistivity.

The moving members can be classified in accordance with their specific density, too, from the relation between their moving time and the internal electric time constant. Therefore, the dust of the kind which has not been easy to classify by the conventional electromagnetic classification, such as non-magnetic materials approximate to dielectrics, composite materials, and so forth, can be classified by adding this station to a classifier, and the objects of discrimination can be drastically expanded.

The specific gravity, electric conductivity, specific dielectric constant, etc., of the moving member can be classified, as well, by taking into consideration such factors as the driving frequency, the relation between the driving direction and the direction of the gravitational force, the relation of the external forces such as between the driving direction and the direction of the wind, and so forth, in addition to the gap pitch between the adjacent belt-like electrodes, during the classification.

The weight area ratio can also be classified because only those moving members that have a greater resultant force to the gravitational force of the moving members move while the stationary member are kept inclined.

Whether or not the article has moved can be determined by the sue of a photoelectric sensor the axis of detection of which passes between the belt-like electrodes. The movement of the moving member can be detected by disposing such photoelectric sensors between also the belt-like electrodes and detecting the change of the detection output of each photoelectric sensor. In this case, a known transparent or high transmissivity insulating material can be used as the stationary member.

Though the explanation with reference to FIGS. 9 to 38 explains the case where only the high resistance body is used as the moving member, the high resistance body layer may be laminated on the insulator layer when the moving member has the structure shown in FIGS. 9 to 38.

Though the description given above explains only the case where the PET film is used as the insulating film, the present invention is not limited to the PET film and needless to say, a flexible thin film having an insulating property can be used.

Furthermore, when the contact surface of either one of the stationary member and the moving member is made on a flat surface and corrugations are formed on the contact surface of the other, the friction between them can be reduced. Furthermore, when the moving member receives the force in the floating direction due to the force of repulsion between the induced charge and the charge of the belt-like electrodes on the stationary member side, the air is permitted to quickly flow between them and the floating operation of the moving member can be effected quickly.

The present invention is not limited to the embodiments described above, but can be changed or modified in various ways on the basis of the gist of the invention, and such changes or modifications are not excluded from the scope of the invention.

According to the present invention, an electrostatic actuator whose construction can be simplified and which has a short charging time can be accomplished.

We claim:

1. An electrostatic actuator comprising:
   a first member having a plurality of belt-like electrodes insulated from one another and disposed in a predetermined direction with predetermined gaps between the belt-like electrodes;
   a second member having an opposed surface made of a resistance body, said opposed surface coming into contact with a surface of said first member; and
   control means for changing an impressed voltage to be applied to each of said plurality of belt-like electrodes disposed on said first member,
   said first and second members being relatively moved in a direction perpendicular to a direction of an arrangement of said belt-like electrodes, by said control means, and
   a value of a time constant of said resistance body in said second member, determined primarily by volume resistivity and dielectric constant of a material constituting said resistance body, is predetermined so as to be twice or more of a time necessary for at least one of said first and second members to relatively move a distance corresponding to a length between said belt-like electrodes.

2. An electrostatic actuator according to claim 1, wherein the contact between said first and second members is eliminated and said first and second members are relatively moved by driving said control means for supplying voltages to said plurality of belt-like electrodes disposed on said first member.

3. An electrostatic actuator according to claim 1, wherein said control means is capable of supplying pulse voltages to said plurality of belt-like electrodes and is capable of changing said pulse voltages to be supplied to said belt-like electrodes.

4. An electrostatic actuator according to claim 1, wherein the volume resistivity of said material constituting the resistance body in said second member is from $10^9$ to $10_{19}$ $\Omega$cm.

5. An electrostatic actuator according to claim 1, wherein the volume resistivity of said material constituting the resistance body in said second member is from $10^{13}$ to $10^{15}$ $\Omega$cm.

6. An electrostatic actuator according to claim 1, wherein a plurality of first members and a plurality of second members are alternately laminated so that belt-like electrodes of the first members and corresponding resistance bodies of the second members, face one another.

7. An electrostatic actuator according to claim 9, wherein each of said first and second members is rectangular, each of the first and second members have end portions, and the end portions of at least one of said first and second members are mutually and integrally bonded together.

8. An electrostatic actuator comprising:
a flat sheet-like first member having a plurality of belt-like electrodes insulated from one another;
a second member consisting of a thin film member having a resistance body disposed so as to face said first member, and a holding member supporting both ends of said thin film member and having a recess permitting deflection of an intermediate portion of said thin film member; and
control means for moving said first and second members relative to each other by switching a voltage to be applied to said belt-like electrodes.

9. An apparatus supplied with at least one voltage, comprising:
a first member including substantially parallel electrodes extending in a first direction and having a predetermined spacing, and at least one insulating material arranged to insulate the electrodes from one another, the at least one insulating material having a surface; and
a second member having a surface and including a resistance body, the surface of the second member being arranged to oppose the surface of the at least one insulating material.
the second member being caused to move relative to the first member, in a second direction perpendicular to the first direction and along the surface of the at least one insulating material, by applying and changing the at least one voltage supplied to at least one of the electrodes, and
a value of a time constant of the resistance body, determined primarily by volume resistivity and dielectric constant of a material constituting the resistance body, being predetermined so as to be twice or more of a time necessary for the second member to move, by supplying and changing the at least one voltage, a distance relative to the first member equal to the predetermined spacing of the electrodes.

10. An apparatus as claimed in claim 9, wherein the electrodes include first, second and third groups of commonly-connected, equally-spaced electrodes, and wherein the at least one voltage includes first, second and third voltage pulses supplied to the first, second and third groups, respectively.

11. An apparatus as claimed in claim 9, wherein the resistance body includes first and second portions, and wherein the second member includes a holding member having first and second ends supporting the first and second portions, the holding member having a recess in between the first and second portions.

12. An electrostatic actuator comprising:
a flat sheet-like first member having a plurality of belt-like electrodes insulated from one another;
a second member consisting a thin film member having a resistance body disposed so as to face said first member, and a holding member supporting both ends of said thin film member and having a recess permitting deflection of an intermediate portion of said thin film member, the resistance body of the second member being such that a value of a time constant of the resistance body, determined primarily by volume resistivity and dielectric constant of a material constituting the resistance body, is predetermined to be twice or more of the time necessary for the second member to move by switching a voltage applied to the belt-like electrodes, a distance relative to the first member equal to a predetermined spacing of the belt-like electrodes; and
control means for moving said first and second members relative to each other by switching the voltage to be applied to said belt-like electrodes.

* * * * *